(12) United States Patent
Kuwata

(10) Patent No.: US 7,899,269 B2
(45) Date of Patent: Mar. 1, 2011

(54) METHOD AND DEVICE FOR IMAGE QUALITY ADJUSTMENT OF MULTIPLE SUBJECT IMAGE DATA ON LAYOUT LOCATIONS IN ORNAMENTAL IMAGE DATA

(75) Inventor: Naoki Kuwata, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1413 days.

(21) Appl. No.: 10/937,101

(22) Filed: Sep. 8, 2004

(65) Prior Publication Data

US 2005/0134900 A1    Jun. 23, 2005

(30) Foreign Application Priority Data

Sep. 9, 2003   (JP) .............................. 2003-316124
Sep. 9, 2003   (JP) .............................. 2003-316126

(51) Int. Cl.
G06K 9/36   (2006.01)
G06K 9/00   (2006.01)
G06K 15/00  (2006.01)

(52) U.S. Cl. ........................ 382/284; 382/112; 358/1.18
(58) Field of Classification Search .................. 382/112, 382/284

See application file for complete search history.

(56) References Cited

U.S. PATENT DOCUMENTS

| | | | | |
|---|---|---|---|---|
| 5,459,819 | A | * | 10/1995 | Watkins et al. ............. 358/1.18 |
| 5,469,536 | A | * | 11/1995 | Blank .......................... 345/594 |
| 5,671,072 | A |   | 9/1997  | Umemoto |
| 6,647,153 | B1| * | 11/2003 | Ito .............................. 382/284 |
| 6,822,756 | B1| * | 11/2004 | Cok et al. ................... 358/1.9 |
| 2003/0151667 | A1 | * | 8/2003 | Nakami et al. ........... 348/207.1 |

FOREIGN PATENT DOCUMENTS

| | | |
|---|---|---|
| DE | 197 32 241 | 2/1998 |
| EP | 0 647 057  | 4/1995 |
| EP | 1 439 696  | 7/2004 |
| GB | 2 246 929  | 2/1992 |

(Continued)

OTHER PUBLICATIONS

Abstract of Japanese Patent Publication No. 08-095160, Pub. Date: Apr. 12, 1996, Patent Abstracts of Japan.

(Continued)

*Primary Examiner*—David P Rashid
(74) *Attorney, Agent, or Firm*—Martine Penilla & Gencarella, LLP

(57) ABSTRACT

A CPU 200 selects one or multiple image data GD to be pasted on ornamental image data among plurality of input image data GD and gains image processing control information GI related to the selected image data GD. The CPU 200 selects desired ornamental image data FD and gains layout control information LI related to the selected ornamental image data FD. The CPU 200 also reads image quality adjustment information GC included in the layout control information LI. The CPU 200 executes image quality adjustment of each of the selected image data GD with the image processing control information GI and the image quality adjustment information GC. The CPU 200 pastes the respective image data GD, which have gone through the image quality adjustment, on the ornamental image data FD according to the layout control information LI to generate resulting output image data.

28 Claims, 20 Drawing Sheets

FOREIGN PATENT DOCUMENTS

| | | |
|---|---|---|
| JP | 08-095160 | 4/1996 |
| JP | 2000-078503 | 3/2000 |
| JP | 2000-165647 | 6/2000 |
| JP | 2000-244722 | 9/2000 |
| JP | 2001-346024 | 12/2001 |
| JP | 2002-111995 | 4/2002 |
| JP | 2002-204412 | 7/2002 |
| JP | 2002-218217 | 8/2002 |
| JP | 2002-252783 | 9/2002 |
| JP | 2002-344989 | 11/2002 |
| JP | 3386373 | 1/2003 |

OTHER PUBLICATIONS

Abstract of Japanese Patent Publication No. 2000-078503, Pub. Date: Mar. 14, 2000, Patent Abstracts of Japan.

Abstract of Japanese Patent Publication No. 2000-244722, Pub Date: Sep. 8, 2000, Patent Abstracts of Japan.

Abstract of Japanese Patent Publication No. 2001-346024, Pub Date: Dec. 14, 2001, Patent Abstracts of Japan.

Abstract of Japanese Patent Publication No. 2002-111995, Pub Date: Apr. 12, 2002, Patent Abstracts of Japan.

Abstract of Japanese Patent Publication No. 2002-204412, Pub Date: Jul. 19, 2002, Patent Abstracts of Japan.

Abstract of Japanese Patent Publication No. 2002-218217, Pub. Date: Aug. 2, 2002, Patent Abstracts of Japan.

Abstract of Japanese Patent Publication No. 2002-252783, Pub. Date: Sep. 6, 2002, Patent Abstracts of Japan.

Abstract of Japanese Patent Publication No. 10-293856, Pub. Date: Nov. 4, 1998, Patent Abstracts of Japan.

Abstract of Japanese Patent Publication No. 2003-030670, Pub. Date: Jan. 31, 2003, Patent Abstracts of Japan.

Abstract of Japanese Patent Publication No. 2000-165647, Pub. Date: Jun. 16, 2000, Patent Abstracts of Japan.

Abstract of Japanese Patent Publication No. 2002-344989, Pub. Date: Nov. 29, 2002, Patent Abstracts of Japan.

Abstract of Japanese Patent Publication No. JP 11-352601, Pub. Date: Dec. 24, 1999, Patent Abstracts of Japan.

Abstract of Japanese Patent Publication No. JP 10-161894, Pub Date: Jun. 19, 1998, Patent Abstracts of Japan.

* cited by examiner

Fig.7

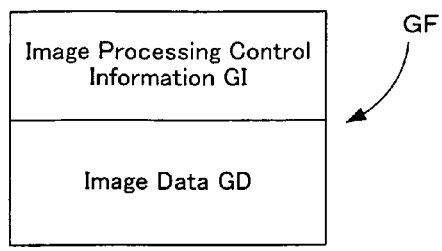

Fig.8

|  | Subject of Ornamental image Data FD (Season) | | | |
|---|---|---|---|---|
| Image Quality Adjustment Information GC | April | May | June | July |
| Contrast | Weaker | Standard | Stronger | Stronger |
| Brightness | Brighter | Brighter | Standard | Standard |
| Saturation | Standard | Higher | Standard | Higher |
| Sharpness | Lower | Standard | Standard | Higher |
| Memory Color Flesh | Standard | Standard | Standard | Standard |
| Memory Color Green | Standard | Stronger | Stronger | Stronger |
| Memory Color Sky | Standard | Standard | Stronger | Stronger |

Fig.9

| | Subject of Ornamental image Data FD (Event) | | | |
|---|---|---|---|---|
| Image Quality Adjustment Information GC | Birthday | Christmas | Firework | Wedding |
| Contrast | Weaker | Stronger | Stronger | Standard |
| Brightness | Brighter | Standard | Darker | Brighter |
| Saturation | Higher | Higher | Higher | Standard |
| Sharpness | Higher | Higher | Higher | Lower (Soft Focus) |
| Memory Color Flesh | Stronger | Standard | Standard | Stronger |
| Memory Color Green | Standard | Standard | Standard | Standard |
| Memory Color Sky | Standard | Standard | Standard | Standard |
| Noise Removal | Off | Off | On | Off |

Fig.10

| Mode | Contrast | Brightness | Color Balance | Saturation | Sharpness | Memory Colors | Noise Removal |
|---|---|---|---|---|---|---|---|
| 1 | Standard | Standard | Standard | Standard | Standard | Off | Off |
| 2 | Slightly Soft | Slightly Brighter | Standard | Slightly Lower | Slightly Lower | Flesh | Off |
| 3 | Slightly Hard | Standard | Standard | Slightly Higher | Slightly Higher | Sky & Green | Off |
| 4 | Standard | Darker | Off | Standard | Slightly Lower | Red | On |
| 5 | Standard | Darker | Off | Standard | Standard | Off | On |
| 6 | Slightly Soft | Slightly Brighter | Lighter | Slightly Higher | Standard | Green | Off |
| 7 | Standard | Standard | Lighter | Standard | Higher | Off | Off |
| 8 | Hard | Standard | Standard | Slightly Higher | Higher | Off | Off |
| 9 | Slightly Soft | Brighter | Standard | Standard | Standard | Off | Off |
| 10 | Standard | Standard | Standard | Higher | Slightly Higher | Red | Off |
| 11 | Standard | Slightly Brighter | Standard | Standard | Slightly Higher | Flesh | Off |

Fig.11

|  |  | Image Quality Adjustment Information GC | | |
|---|---|---|---|---|
| Image Processing Control Information GI | | Higher | Standard | Lower |
| | Higher | Higher | Higher | Standard |
| | Standard | Higher | Standard | Lower |
| | Lower | Standard | Lower | Lower |

|  | Ornamental image Data FD | |
| --- | --- | --- |
| Image Quality Adjustment Information GC | FD1 | FD2 |
| Contrast | Weaker | Stronger |
| Brightness | Brighter | Standard |
| Saturation | Higher | Higher |
| Sharpness | Higher | Higher |
| Memory Color Flesh | Stronger | Standard |
| Memory Color Green | Standard | Standard |
| Memory Color Sky | Standard | Standard |

| Layout Location | Correction Level |
|---|---|
| A | 0.8 |
| B | 1.0 |
| C | 0.7 |

Fig.23

| Layout Location | Contrast | Brightness | Saturation | Sharpness |
|---|---|---|---|---|
| A | Standard | Standard | Standard | Standard |
| B | Higher | Standard | Higher | Higher |
| C | Standard | Darker | Standard | Standard |

| Layout Location | Position | Size | Priority | Correction Level |
|---|---|---|---|---|
| A | Corner | Medium | 2 | Standard |
| B | Center | Large | 1 | Higher |
| C | Corner | Small | 3 | Standard |

Fig.27

| Main Layout Location | Weighting Coefficient (Layout Location) | | |
|---|---|---|---|
| | A | B | C |
| A | 1.0 | 0.0 | 0.0 |
| B | 0.5 | 0.5 | 0.0 |
| C | 0.4 | 0.0 | 0.6 |

METHOD AND DEVICE FOR IMAGE QUALITY ADJUSTMENT OF MULTIPLE SUBJECT IMAGE DATA ON LAYOUT LOCATIONS IN ORNAMENTAL IMAGE DATA

BACKGROUND OF THE INVENTION

1. Field of Technology

The present invention relates to a technique of generating output image data, based on ornamental image data that gives some ornamental effect to subject image data and layout control information that specifies a layout location and layout dimensions of the subject image data to be laid out on the ornamental image data.

2. Description of the Related Art

There are some practical techniques of pasting subject image data, for example, image data taken by an imaging device, on ornamental image data, for example, frame image data, to output a resulting output image including an objective image surrounded by an ornamental image on a medium, such as paper. This technique uses layout control information including a script that describes a layout location and layout dimensions of the subject image data laid out on the ornamental image data.

The layout control information is related to the ornamental image data. In response to the user's selection and layout of subject image data on ornamental image data, this technique pastes the subject image data resized to preset dimensions at a preset location in the ornamental image data and thereby generates a resulting output image including the objective image surrounded by the ornamental image.

The prior art technique, however, can not make the subject of the ornamental image data, for example, the season or the event, well matched with the image quality of the subject image data pasted on the ornamental image data.

In the case of pasting multiple subject image data on identical ornamental image data, the prior art technique does not execute image quality adjustment between the respective subject image data and thereby fails to attain an impressive output of the multiple subject image data pasted on the ornamental image data.

In some cases, subject image data having largest dimensions may be required to have better impression than other subject image data. In other cases, all subject image data pasted on ornamental image data may be required to have similar image qualities.

SUMMARY OF THE INVENTION

The object of the invention is thus to eliminate the drawbacks of the prior art and to execute image processing that causes the image quality of subject image data laid out on ornamental image data to be well matched with the image quality of the ornamental image data and thereby ensures a favorably impressive output result. The object of the invention is also to adequately execute image quality adjustment of multiple subject image data to be laid out in respective layout locations on ornamental image data.

In order to attain at least part of the above and the other related objects, a first aspect of the invention is an image processing device that executes image processing of subject image data, which is to be laid out on ornamental image data. The image processing device of the first aspect of the invention includes: a subject image data acquisition module that obtains the subject image data; an ornamental image data acquisition module that obtains the ornamental image data; a layout control information acquisition module that obtains layout control information, which is related to the obtained ornamental image data and specifies a layout location and layout dimensions of the subject image data to be laid out on the ornamental image data and image quality adjustment information regarding the subject image data; an image quality adjustment module that execute image quality adjustment of the obtained subject image data according to the image quality adjustment information specified in the obtained layout control information; and an output image data generation module that generates output image data from the subject image data, which has gone through the image quality adjustment, and the ornamental image data according to the layout control information.

The image processing device of the first aspect executes image quality adjustment of the obtained subject image data with the image quality adjustment information specified in the layout control information, and generates output image data from the image quality-adjusted subject image data and the ornamental image data according to the layout control information. This arrangement causes the image quality of the subject image data laid out on the ornamental image data to be well matched with the image quality of the ornamental image data and ensures an impressive output result.

In the image processing device as the first aspect of the invention, the image quality adjustment information may include correction information of the subject image data. The correction information of the subject image data may include at least one correction rate of at least one image quality adjustment parameter affecting image quality of the subject image data. The layout control information is used to control correction of the subject image data. The image quality adjustment information, which specifies the correction rate of at least one image quality adjustment parameter affecting the image quality of the subject image data, is applied to totally control correction of the subject image data.

In one preferable arrangement of the first aspect of the image processing device, the ornamental image data is image data having a preset subject, and the correction information of the subject image data includes correction rates of multiple image quality adjustment parameters suited to the preset subject of the ornamental image data. This arrangement ensures image quality adjustment of the subject image data suited to the subject of the ornamental image data.

In the image processing device as the first aspect of the invention, the image quality adjustment information may specify a correction level of the subject image data. The image quality adjustment information is applied to regulate the degree of correction.

In one preferable arrangement of the first aspect of the invention, the image processing device further includes a characteristic value determination module that analyzes the subject image data to specify a characteristic value of an image quality adjustment parameter affecting image quality of the subject image data; and a correction rate setting module that sets a correction rate of the subject image data, in order to cancel out or reduce a difference between the specified characteristic value and a preset reference value. The correction level is used to vary the correction rate. The structure of this arrangement sets the correction rate of the subject image data corresponding to its image quality characteristic and varies the correction rate with the correction level specified in the image quality adjustment information. This arrangement ensures image quality adjustment suited to both the subject image data and the ornamental image data.

In the first aspect of the image processing device of the invention, it is preferable that the ornamental image data is image data having a preset subject. The correction rate setting module sets correction rates with regard to multiple image quality adjustment parameters affecting the image quality of the subject image data. The correction level is set with regard to each of the multiple image quality adjustment parameters and is suited to the preset subject of the ornamental image data. This arrangement totally controls correction of the subject image data suited to the subject of the ornamental image data.

In the first aspect of the image processing device of the invention, it is preferable that image processing control information for specifying an image processing condition is related to the subject image data, and that the image quality adjustment module uses the image processing control information preferentially over the image quality adjustment information to execute image quality adjustment of the subject image data. This arrangement preferentially executes image quality adjustment under the specified image processing condition, so as to meet the user's demands.

In the first aspect of the image processing device of the invention, it is preferable that image processing control information for specifying an image processing condition is related to the subject image data and that the image quality adjustment module uses the image quality adjustment information preferentially over the image processing control information to execute image quality adjustment of the subject image data. This arrangement ensures an impressive output result having the well-balanced image quality of the subject image data and the ornamental image data.

In the first aspect of the image processing device of the invention, it is preferable that image processing control information for specifying an image processing condition is related to the subject image data and that the image quality adjustment module uses combination of the image quality adjustment information with the image processing control information to execute image quality adjustment of the subject image data. This arrangement ensures image quality adjustment of the subject image data suited to the specified image processing condition, as well as suited to the ornamental image data.

In one preferable arrangement of the image processing device as the first aspect of the invention, the ornamental image data has multiple layout locations, and the subject image data acquisition module obtains multiple subject image data. The layout control information is related to the obtained ornamental image data and specifies layout locations and layout dimensions of the multiple subject image data, which are laid out on the ornamental image data having the multiple layout locations, and image quality adjustment information regarding the multiple subject image data. The image quality adjustment module executes image quality adjustment of the obtained multiple subject image data to be laid out in the respective layout locations on the ornamental image data according to the image quality adjustment information specified in the obtained layout control information, and the output image data generation module generates the output image data from the multiple subject image data, which have gone through the image quality adjustment, and the ornamental image data according to the layout control information.

The first aspect of the image processing device of the invention executes image quality adjustment of the multiple subject image data, which are laid out in the respective layout locations on the ornamental image data, according to the image quality adjustment information specified in the layout control information. The output image data is generated from the image quality-adjusted multiple subject image data and the ornamental image data, based on the layout control information. This arrangement causes the image quality of the multiple subject image data laid out on the ornamental image data to be well matched with the image quality of the ornamental image data and thereby ensures an impressive output result.

The image processing device as the first aspect of the invention may further include a modification module that modifies a result of the image quality adjustment of the subject image data executed according to the image quality adjustment information. This structure enables the result of the image quality adjustment of the subject image data executed with the image quality adjustment information to be modified according to the user's demands.

A second aspect of the invention is an image processing method that that executes image processing of subject image data, which is to be laid out on ornamental image data. The image processing method of the second aspect of the invention includes: obtaining the subject image data; obtaining the ornamental image data; obtaining layout control information, which is related to the obtained ornamental image data and specifies a layout location and layout dimensions of the subject image data to be laid out on the ornamental image data and image quality adjustment information regarding the subject image data; executing image quality adjustment of the obtained subject image data according to the image quality adjustment information specified in the obtained layout control information; and generating output image data from the subject image data, which has gone through the image quality adjustment, and the ornamental image data according to the layout control information.

The image processing method as the second aspect of the invention has similar functions and effects to those of the image processing device as the first aspect of the invention. The diverse arrangements of the image processing device as the first aspect of the invention are also applicable to the image processing method as the second aspect of the invention.

In the image processing method as the second aspect of the invention, the subject image data obtaining is executed by obtaining multiple subject image data. The layout control information is related to the obtained ornamental image data and specifies layout locations and layout dimensions of the multiple subject image data to be laid out on the ornamental image data having multiple layout locations, as well as image quality adjustment information regarding the multiple subject image data. The image quality adjustment executing is executed by executing image quality adjustment of the obtained multiple subject image data to be laid out in the respective layout locations on the ornamental image data according to the image quality adjustment information specified in the obtained layout control information. The output image data generating is executed by generating the output image data from the multiple subject image data, which have gone through the image quality adjustment, and the ornamental image data according to the layout control information.

The image processing method in the second aspect of the invention may also be actualized by a corresponding image processing program and a computer readable recording medium in which such an image processing program is recorded.

A third aspect of the invention is an image processing device that executes image processing of subject image data, which is to be laid out on ornamental image data. The image processing device of the third aspect of the invention includes: a subject image data selection module that selects multiple subject image data to be laid out in multiple layout locations of the ornamental image data; an image quality adjustment module that obtains layout control information, which specifies layout locations and layout dimensions of the selected multiple subject image data to be laid out in the respective layout locations on the ornamental image data and correction rates of the selected multiple subject image data in the respective layout locations, and executes image quality adjustment of the selected multiple subject image data with the specified correction rates; and an output image data generation module that generates output image data from the multiple subject image data, which have gone through the image quality adjustment, and the ornamental image data according to the layout control information.

The image processing device as the third aspect of the invention executes image quality adjustment of the respective selected subject image data with the correction rates specified in the obtained layout control information. The layout control information is thus effectively applied to adequately execute image quality adjustment of the multiple subject image data, which are laid out in the respective layout locations on the ornamental image data.

In one preferable arrangement of the third aspect of the invention, the image processing device further includes a subject image data analyzing module that analyzes each of the selected multiple subject image data to determine a characteristic value of an image quality adjustment parameter affecting image quality of the subject image data. The correction rate is set corresponding to at least either of the layout location and the layout dimensions. The image quality adjustment module executes the image quality adjustment of each of the selected multiple subject image data with the correction rate, which is set to cancel out or reduce a difference between the determined characteristic value and a preset reference value with regard to the image quality adjustment parameter. The analysis of each subject image data enables the image quality adjustment to be executed by taking into account the characteristic of the subject image data. Combination of the characteristic of the analyzed subject image data with the correction rate specified in the layout control information ensures execution of the adequate image quality adjustment at each layout location.

In the third aspect of the image processing device of the invention, it is preferable that the correction rate of subject image data located in a center area of the ornamental image data is set to be greater than the correction rate of subject image data located in another area of the ornamental image data. The image quality adjustment module executes the image quality adjustment of the selected multiple subject image data, in such a manner that a degree of reduction of the difference increases with an increase in correction rate. In this arrangement, the degree of reduction of the difference increases with an increase in correction rate specified in the layout control information. This ensures enhanced image quality adjustment of the respective subject image data. The correction rate for the subject image data located in the center area of the ornamental image data is set to be greater than the correction rate for the subject image data located in another area. This desirably improves the impression of the subject image data located in the center area of the ornamental image data.

In the third aspect of the image processing device of the invention, it is also preferable that the correction rate of subject image data having largest layout dimensions is set to be greater than the correction rate of another subject image data. The image quality adjustment module executes the image quality adjustment of the selected multiple subject image data, in such a manner that a degree of reduction of the difference increases with an increase in correction rate. In this arrangement, the degree of reduction of the difference increases with an increase in correction rate specified in the layout control information. This ensures enhanced image quality adjustment of the respective subject image data. The correction rate for the subject image data having the largest layout dimensions is set to be greater than the correction rate for another subject image data. This desirably improves the impression of the subject image data having the largest layout dimensions.

A fourth aspect of the invention is an image processing device that executes image processing of subject image data, which is to be laid out on ornamental image data. The image processing device of the fourth aspect of the invention includes: a subject image data selection module that selects multiple subject image data to be laid out in multiple layout locations of the ornamental image data; a subject image data analyzing module that analyzes each of the selected multiple subject image data to determine a characteristic value of an image quality adjustment parameter affecting image quality of the subject image data; an image quality adjustment module that obtains layout control information, which specifies layout locations and layout dimensions of the multiple subject image data to be laid out in the respective layout locations on the ornamental image data and correction levels of the selected multiple subject image data in the respective layout locations, and executes image quality adjustment of each of the selected multiple subject image data at the correction level to cancel out or reduce a difference between the characteristic value and a preset reference value with regard to the image quality adjustment parameter; and an output image data generation module that generates output image data from the multiple subject image data, which have gone through the image quality adjustment, and the ornamental image data according to the layout control information.

The image processing device as the fourth aspect of the invention analyzes each of the selected multiple subject image data to determine a characteristic value of an image quality adjustment parameter affecting the image quality of the subject image data. Image quality adjustment of each subject image data is executed at the correction level specified in the obtained layout control information to cancel out or reduce a difference between the determined characteristic value and a preset reference value with regard to the image quality adjustment parameter. This arrangement ensures adequate image quality adjustment of the selected multiple subject image data laid out in the respective layout locations on the ornamental image data, based on both the layout control information and the results of analysis of the respective subject image data.

A fifth aspect of the invention is an image processing device that executes image processing of subject image data, which is to be laid out on ornamental image data. The image processing device of the fifth aspect of the invention includes: a subject image data selection module that selects multiple subject image data to be laid out in multiple layout locations of the ornamental image data; an image quality adjustment level setting module that obtains layout control information, which specifies layout locations and layout dimensions of the selected multiple subject image data laid out on the ornamental image and priorities of the respective layout locations, and sets image quality adjustment levels of the respective selected subject image data corresponding to the specified priorities; an image quality adjustment module that executes image quality adjustment of the selected multiple subject image data according to the image quality adjustment levels; and an output image data generation module that generates output image data from the multiple subject image data, which have gone through the image quality adjustment, and the ornamental image data according to the layout control information.

The image processing device as the fifth aspect of the invention sets the image quality adjustment levels for the selected multiple subject image data, based on the priorities specified in the obtained layout control information. Image quality adjustment of the respective selected subject image data is executed according to the image quality adjustment levels. This arrangement ensures adequate image quality adjustment of the selected multiple subject image data laid out in the respective layout locations on the ornamental image data, based on the layout control information.

In one preferable arrengement of the image processing device as the fifth aspect of the invention, the image quality adjustment level setting module sets the image quality adjustment levels of the respective selected subject image data to give a higher degree of correction for subject image data located in a certain layout location having a highest priority than a degree of correction for subject image data located in another layout location. This arrangement executes the enhanced image quality adjustment of the subject image data located in the layout location having a highest priority and accordingly improves the impression of the subject image data in the layout location having the highest priority.

In another preferable arrangement of the image processing device as the fifth aspect of the invention, the image quality adjustment level setting module sets the image quality adjustment levels of the respective selected subject image data to give a substantially equal degree of correction for subject image data located in a certain layout location having a highest priority with a degree of correction for subject image data located in another layout location. This arrangement ensures practically equivalent image quality adjustment of the respective subject image data laid out on the ornamental image data and accordingly attains favorable harmony of the respective subject image data.

In still another preferable arrangement of the fifth aspect of the invention, the image processing device further includes a subject image data analyzing module that analyzes each of the selected multiple subject image data to determine a characteristic value of an image quality adjustment parameter affecting image quality of the subject image data. The image quality adjustment module executes image quality adjustment of each of the selected multiple subject image data to cancel out or reduce a difference between the determined characteristic value and a preset reference value with regard to the image quality adjustment parameter. The image quality adjustment level setting module sets the image quality adjustment levels of the respective selected subject image data to give a higher degree of the reduction of the difference for subject image data located in a certain layout location having a highest priority than a degree of the reduction of the difference for subject image data located in another layout location. This arrangement ensures enhanced image quality adjustment of subject image data located in a layout location having a highest priority by taking into account the characteristics of the subject image data.

In the image processing device as the fifth aspect of the invention, a higher priority may be given to a layout location having larger layout dimensions or may be given to a layout location closer to a center of the ornamental image data. The layout location having the larger layout dimensions naturally leads to the greater size of the subject image data located therein and is thus significantly affected by the image quality adjustment. The layout location closer to the center of the ornamental image data is generally conspicuous and is thus required to have a better impression by the image quality adjustment.

In any of the third, the fourth, and the fifth aspects of the invention, the image processing device may further include a modification module that modifies a result of the image quality adjustment of each of the selected multiple subject image data executed by said image quality adjustment module. This arrangement enables the image quality of the subject image data to be varied according to the user's demands.

A sixth aspect of the invention is an image processing device that executes image processing of multiple subject image data according to layout control information, which specifies layout locations and layout dimensions of the multiple subject image data laid out on ornamental image data. The image processing device of the sixth aspect of the invention includes: a subject image data selection module that selects the multiple subject image data to be laid out in multiple layout locations of the ornamental image data; a priority allocation module that allocates priorities to the multiple layout locations; an image quality adjustment module that executes image quality adjustment of the selected multiple subject image data, based on the allocated priorities; and an output image data generation module that generates output image data from the multiple subject image data, which have gone through the image quality adjustment, and the ornamental image data according to the layout control information.

The image processing device as the sixth aspect of the invention allocates the priorities to the respective layout locations, sets the image quality adjustment levels of the respective selected subject image data corresponding to the allocated priorities, and executes image quality adjustment of the respective selected subject image data at the image quality adjustment levels.

A seventh aspect of the invention is an image processing device that executes image processing of multiple subject image data according to layout control information, which specifies layout locations and layout dimensions of the multiple subject image data laid out on ornamental image data. The image processing device of the seventh aspect of the invention includes: an ornamental image data acquisition module that obtains plural ornamental image data; a subject image data selection module that selects the multiple subject image data to be laid out in respective layout locations of the obtained plural ornamental image data; a priority allocation module that allocates priorities to the respective layout locations of the obtained plural ornamental image data; an image quality adjustment module that executes image quality adjustment of the selected multiple subject image data, based on the allocated priorities; and an output image data generation module that generates output image data from the multiple subject image data, which have gone through the image quality adjustment, and the plural ornamental image data according to the layout control information.

The image processing device as the seventh aspect of the invention allocates the priorities to the respective layout locations of the plural ornamental image data, sets the image quality adjustment levels of the respective selected subject image data corresponding to the allocated priorities, and executes image quality adjustment of the respective selected subject image data at the image quality adjustment levels. This arrangement ensures adequate image quality adjustment of the subject image data laid out in the respective layout locations on the plural ornamental image data.

In the image processing device as the seventh aspect of the invention, the priority allocation module may allocate the priorities to the layout locations corresponding to positions and dimensions of the respective layout locations. Namely the priority orders are allocated according to the layout control information.

In one preferable arrangement of the seventh aspect of the invention, the image processing device further includes a priority input module that inputs preset priorities, and the priority allocation module allocates the input preset priorities to the respective layout locations. In this structure, the priorities are allocated by an operation of the priority input module.

In another preferable arrangement of the image processing device as the seventh aspect of the invention, the image quality adjustment module executes the image quality adjustment of the selected multiple subject image data, in such a manner that a degree of correction of subject image data located in a layout location having a highest priority is set higher than a degree of correction of subject image data located in another layout location. This arrangement ensures enhanced image quality adjustment of subject image data located in a layout location having a highest priority, compared with subject image data located in another layout location.

In still another preferable arrangement of the seventh aspect of the invention, the image processing device further includes a subject image data analyzing module that analyzes each of the selected multiple subject image data to determine a characteristic value of an image quality adjustment parameter affecting image quality of the subject image data. The image quality adjustment module executes the image quality adjustment of each of the selected multiple subject image data, in such a manner that a degree of reduction of a difference between the determined characteristic value and a preset reference value with regard to the image quality adjustment parameter for subject image data located in a certain layout location having a highest priority is set higher than a degree of reduction of the difference for subject image data located in another layout location. This arrangement ensures image quality adjustment by taking into account the characteristics of the respective subject image data. This arrangement also ensures enhanced image quality adjustment of subject image data located in a layout location having a highest priority, compared with subject image data located in another layout location.

In either of the sixth and the seventh aspects of the invention, the image processing device may further include a modification module that modifies a result of the image quality adjustment of each of the selected multiple subject image data executed by said image quality adjustment module. This arrangement enables the image quality of the subject image data to be varied according to the user's demands.

An eighth aspect of the invention is an image processing method that executes image processing of subject image data, which is to be laid out on ornamental image data. The image processing method of the eighth aspect of the invention includes: selecting multiple subject image data to be laid out in multiple layout locations of the ornamental image data; obtaining layout control information, which specifies layout locations and layout dimensions of the selected multiple subject image data to be laid out in the respective layout locations on the ornamental image data and correction rates of the selected multiple subject image data in the respective layout locations, and executing image quality adjustment of the selected multiple subject image data with the specified correction rates; and generating output image data from the multiple subject image data, which have gone through the image quality adjustment, and the ornamental image data according to the layout control information.

The image processing method as the eighth aspect of the invention has similar functions and effects to those of the image processing device as the third aspect of the invention. The diverse arrangements of the image processing device as the third aspect of the invention are also applicable to the image processing method as the eighth aspect of the invention.

A ninth aspect of the invention is an image processing method that executes image processing of subject image data, which is to be laid out on ornamental image data. The image processing method of the ninth aspect of the invention includes: selecting multiple subject image data to be laid out in multiple layout locations of the ornamental image data; analyzing each of the selected multiple subject image data to determine a characteristic value of an image quality adjustment parameter affecting image quality of the subject image data; obtaining layout control information, which specifies layout locations and layout dimensions of the multiple subject image data to be laid out in the respective layout locations on the ornamental image data and correction levels of the selected multiple subject image data in the respective layout locations, and executing image quality adjustment of each of the selected multiple subject image data at the correction level to cancel out or reduce a difference between the characteristic value and a preset reference value with regard to the image quality adjustment parameter; and generating output image data from the multiple subject image data, which have gone through the image quality adjustment, and the ornamental image data according to the layout control information.

The image processing method as the ninth aspect of the invention has similar functions and effects to those of the image processing device as the fourth aspect of the invention. The diverse arrangements of the image processing device as the fourth aspect of the invention are also applicable to the image processing method as the ninth aspect of the invention.

A tenth aspect of the invention is an image processing method that executes image processing of subject image data, which is to be laid out on ornamental image data. The image processing method of the tenth aspect of the invention includes: selecting multiple subject image data to be laid out in multiple layout locations of the ornamental image data; obtaining layout control information, which specifies layout locations and layout dimensions of the selected multiple subject image data laid out on the ornamental image and priorities of the respective layout locations, and setting image quality adjustment levels of the respective selected subject image data corresponding to the specified priorities; executing image quality adjustment of the selected multiple subject image data according to the image quality adjustment levels; and generating output image data from the multiple subject image data, which have gone through the image quality adjustment, and the ornamental image data according to the layout control information.

The image processing method as the tenth aspect of the invention has similar functions and effects to those of the image processing device as the fifth aspect of the invention. The diverse arrangements of the image processing device as the fifth aspect of the invention are also applicable to the image processing method as the tenth aspect of the invention.

An eleventh aspect of the invention is an image processing method that executes image processing of multiple subject image data according to layout control information, which specifies layout locations and layout dimensions of the multiple subject image data laid out on ornamental image data. The image processing method of the eleventh aspect of the invention includes: selecting the multiple subject image data to be laid out in multiple layout locations of the ornamental image data; allocating priorities to the multiple layout locations; executing image quality adjustment of the selected multiple subject image data, based on the allocated priorities; and generating output image data from the multiple subject image data, which have gone through the image quality adjustment, and the ornamental image data according to the layout control information.

The image processing method as the eleventh aspect of the invention has similar functions and effects to those of the image processing device as the sixth aspect of the invention. The diverse arrangements of the image processing device as the sixth aspect of the invention are also applicable to the image processing method as the eleventh aspect of the invention.

A twelfth aspect of the invention is an image processing method that executes image processing of multiple subject image data according to layout control information, which specifies layout locations and layout dimensions of the multiple subject image data laid out on ornamental image data. The image processing method of the twelfth aspect of the invention includes: obtaining plural ornamental image data; selecting the multiple subject image data to be laid out in respective layout locations of the obtained plural ornamental image data; allocating priorities to the respective layout locations of the obtained plural ornamental image data; executing image quality adjustment of the selected multiple subject image data, based on the allocated priorities; and generating output image data from the multiple subject image data, which have gone through the image quality adjustment, and the plural ornamental image data according to the layout control information.

The image processing method as the twelfth aspect of the invention has similar functions and effects to those of the image processing device as the fifth aspect of the invention. The diverse arrangements of the image processing device as the fifth aspect of the invention are also applicable to the image processing method as the tenth aspect of the invention.

The image processing methods in the eighth through the twelfth aspects of the invention may also be actualized by corresponding image processing programs and computer readable recording media in which such image processing programs are recorded.

BRIEF DESCRIPTION OF THE DRAWINGS

FIG. 7 shows the file structure of an image file including image data GD and image processing control information GI;

FIG. 8 shows one example of image quality adjustment information GC according to the subject of the ornamental image data FD specified by the layout control information LI in the first embodiment;

FIG. 9 shows another example of the image quality adjustment information GC according to the subject of the ornamental image data FD specified by the layout control information LI in the first embodiment;

FIG. 10 shows one example of the image processing control information GI;

FIG. 11 shows a combination table of the image processing control information GI and the image quality adjustment information GC in the first embodiment;

FIG. 23 shows settings of correction corresponding to respective layout locations specified by the layout control information LI in the fourth embodiment;

FIG. 27 shows weighting coefficients applied to image data GD, which are laid out in respective layout locations on ornamental image data FD.

DETAILED DESCRIPTION OF THE PREFERRED EMBODIMENTS

The image processing device and the image processing method of the invention are described below as preferred embodiments with reference to the attached drawings.

First Embodiment

Figure 1:
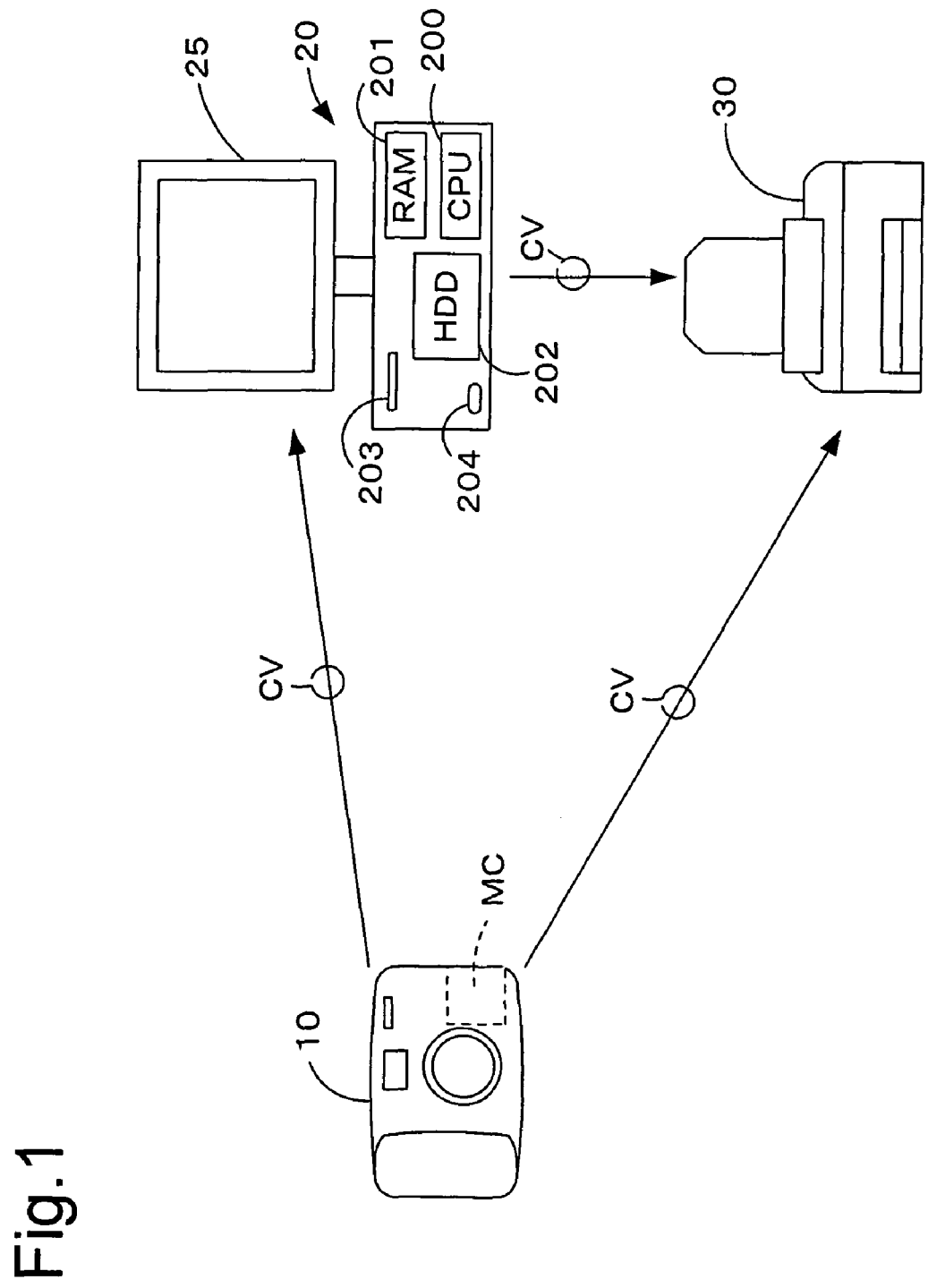
FIG. 1 schematically illustrates the configuration of an image processing system including an image processing device in a first embodiment of the invention.

An image processing system including an image processing device of a first embodiment is described below with reference to FIG. 1. FIG. 1 schematically illustrates the configuration of the image processing system including the image processing device of the first embodiment.

The image processing system includes a digital still camera 10 functioning as an input device to generate image data, a personal computer 20 functioning as the image processing device to execute a series of image processing with regard to input image data generated by the digital still camera 10 and output the processed image data as output image data, and a color printer 30 functioning as an output device to output a processed image corresponding to the output image data. The color printer 30 may have the image processing functions of the personal computer 20. In this case, the stand-alone color printer 30 carries out both the image processing and the image output. The output device is not restricted to the color printer 30 but may be a monitor 25, such as a CRT display or an LCD display, or a projector. In the description below, the color printer 30 connected with the personal computer 20 is used as the output device.

The personal computer 20 is a general computer and includes a central processing unit (CPU) 200 that executes series of image processing with layout control information LI, a random access memory (RAM) 201 that temporarily stores various data including input image data, and a hard disk drive (HDD) 202 (or a read only memory (ROM)) that stores programs and reference tables for execution of the series of image processing with the layout control information LI. The personal computer 20 additionally has a memory card slot 203 to receive a memory card MC inserted therein and input and output terminals 204 connected with connection cables from, for example, the digital still camera 10.

The digital still camera 10 focuses light information on a digital device (a photoelectric conversion element, such as a CCD or a photoelectron multiplier) to take an image. The digital still camera 10 includes a photoelectric conversion circuit with a CCD to convert light information into electric information, an image acquisition circuit to control the photoelectric conversion circuit and obtain a digital image, and an image processing circuit to process the obtained digital image. The digital still camera 10 stores the obtained digital image in the form of digital image data into the memory card MC as a storage device. The JPEG format for lossy compression storage and the TIFF format for lossless compression storage are typically used to store image data taken by the digital still camera 10, although other storage formats, such as RAW format, GIF format, and BMP format may be adoptable.

The digital still camera 10 writes imaging information, which is set at each time of imaging and describes imaging conditions, and image processing control information GI, which is stored in advance in a memory (for example, a ROM) of the digital still camera 10, into a header of image data in the process of generation of the image data and stores the generated image data into the memory card MC. The image processing control information GI includes experimentally obtained pieces of information that enables a selected output device to give a desired output result of an image corresponding to image data generated by any selected image data generation device, such as the digital still camera 10. The image processing control information GI includes the settings of respective parameters for specifying image quality adjustment conditions according to the combination of the digital still camera 10 and the selected output device (for example, the printer 30).

The digital still camera 10 also stores ornamental image data FD, which gives some ornamental effect to subject image data GD, and layout control information LI, which specifies a layout location and layout dimensions of each subject image data GD to be laid out on the ornamental image data FD and is related to the ornamental image data FD, in its memory and writes the ornamental image data FD and the layout control information LI together with the generated image data into the memory card MC. In the description below, each subject image data specified as a layout object is image data taken by an imaging device. The subject image data of the layout object is, however, not restricted to the image data taken by the imaging device but may be any image data mountable on the ornamental image data FD, for example, image data generated by computer graphics. The ornamental image data FD is, for example, frame image data or album mounting image data on which multiple subject image data are pasted, and may be generated in the form of bitmap data or vector data. The layout control information LI has a script specifying the layout location and the layout dimensions of each subject image data GD to be laid out on the ornamental image data FD and includes image quality adjustment information GC as conditions of image quality adjustment of each subject image data GD pasted in each layout location in this embodiment.

The image data generated by the digital still camera 10 is sent to the color printer 30 via a cable CV and the computer 20 or via only a cable CV. An image file of the image data taken by the digital still camera 10 may otherwise be stored in the memory card MC and given to the color printer 30 from the memory card MC, which is inserted into the memory card slot of the personal computer 20 or is directly connected to the color printer 30. In the description below, the personal computer 20 executes a series of image processing with regard to image data and outputs resulting processed image data to the color printer 30.

The color printer 30 is capable of outputting color images and is, for example, an inkjet printer that ejects four color inks, cyan (C), magenta (M), yellow (Y), and black (K), onto a printing medium to create a dot pattern and thereby form an image. The color printer 30 may be an electrophotographic printer that transfers and fixes color toners on a printing medium to form an image. Other color inks, light cyan (LC), light magenta (LM), and dark yellow (DY), may be used in addition to the above four color inks.

Image Processing by Personal Computer 20

Figure 2:
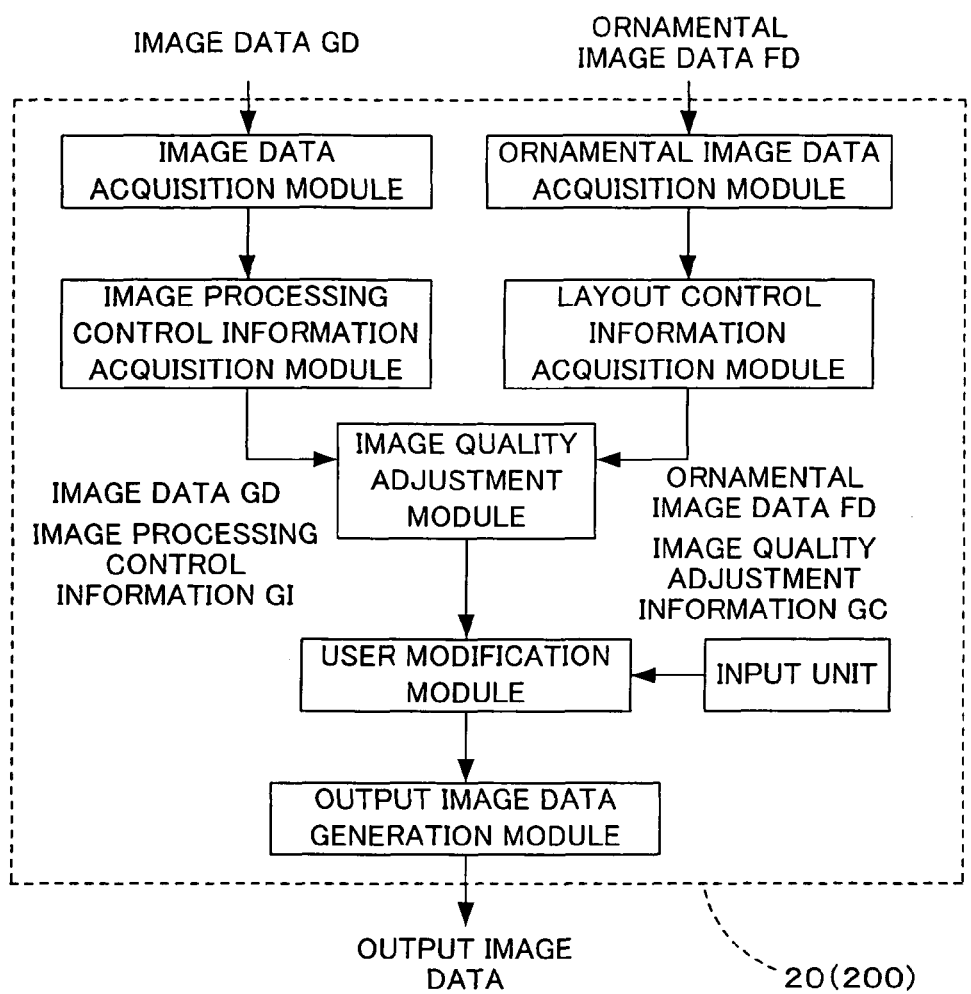
FIG. 2 is a functional block diagram showing the functions of a personal computer 20 (CPU 200) in the first embodiment.

The functional configuration of the personal computer 20 (CPU 200) is described with reference to FIG. 2. FIG. 2 is a functional block diagram showing the functions of the personal computer 20 (CPU 200) in the first embodiment.

The personal computer 20 (the CPU 200) includes an image data acquisition module that selectively obtains one or multiple image data GD to be pasted on ornamental image data, among plurality of input image data GD, and an image processing control information acquisition module that obtains image processing control information GI related to the obtained image data. The CPU 200 also includes ornamental image data acquisition module that obtains desired ornamental image data FD and a layout control information acquisition module that obtains layout control information LI related to the obtained ornamental image data FD.

The CPU 200 further includes an image quality adjustment module that executes image quality adjustment of each image data GD with the image processing control information GI obtained by the image processing control information acquisition module and the layout control information LI obtained by the layout control information acquisition module. The CPU 200 executes image quality adjustment with at least either of image quality adjustment information GC included in the layout control information LI and the image processing control information GI. In the event of failed acquisition of both the image quality adjustment information GC and the image processing control information GI, the CPU 200 does not execute image quality adjustment of the image data GD. The CPU 200 also includes an output image data generation module that pastes each image data GD, which has gone through the image quality adjustment by the image quality adjustment module, on the ornamental image data FD according to the layout control information LI and generates resulting output image data. The CPU 200 further includes a user modification module that modifies the image quality, which has been adjusted with at least either of the image quality adjustment information GC and the image processing control information GI, in response to the user's demands input via an input unit. The user modification module also changes the layout location and the layout dimensions of each image data GD pasted on the ornamental image data FD according to the layout control information LI, in response to the user's requirements.

Figure 3:
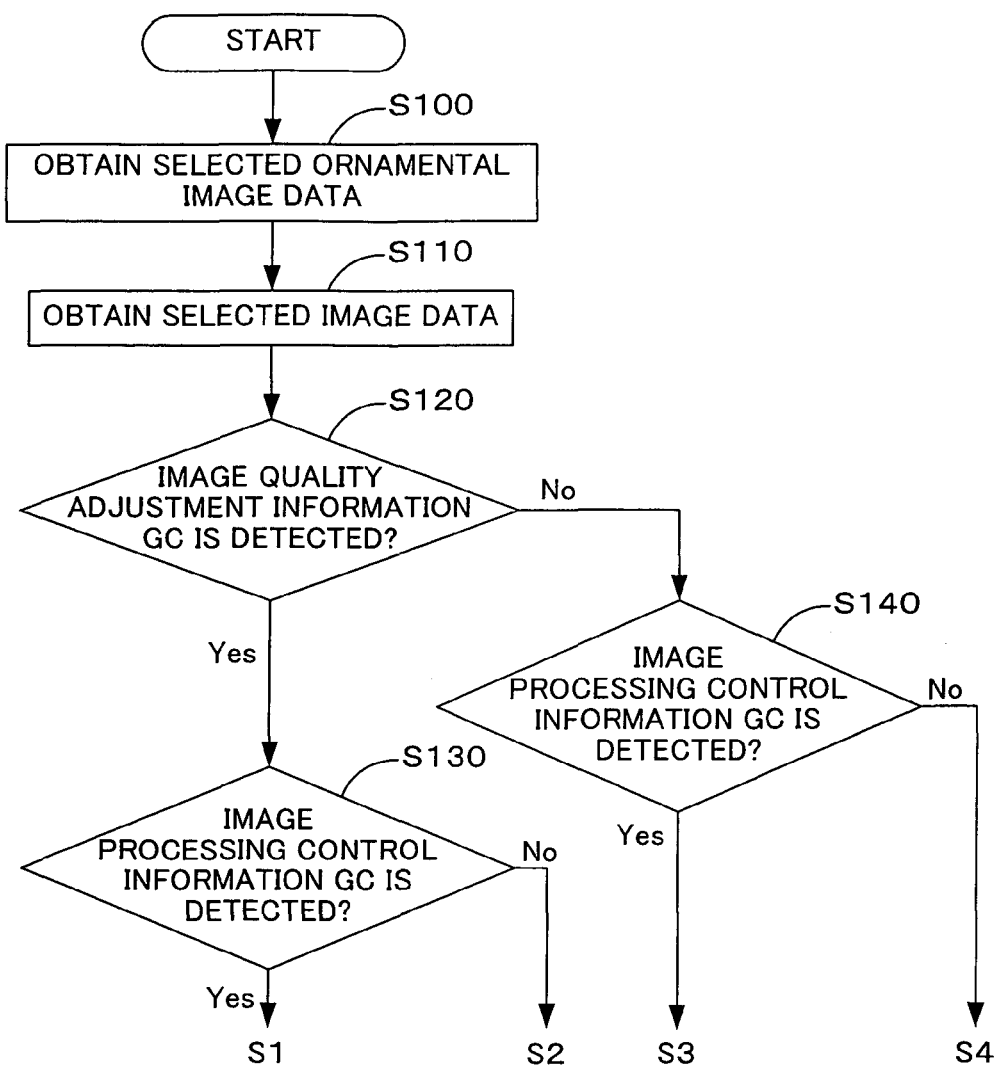
FIG. 3 is a flowchart showing an image processing routine executed by the personal computer 20 in the first embodiment.
Figure 4:
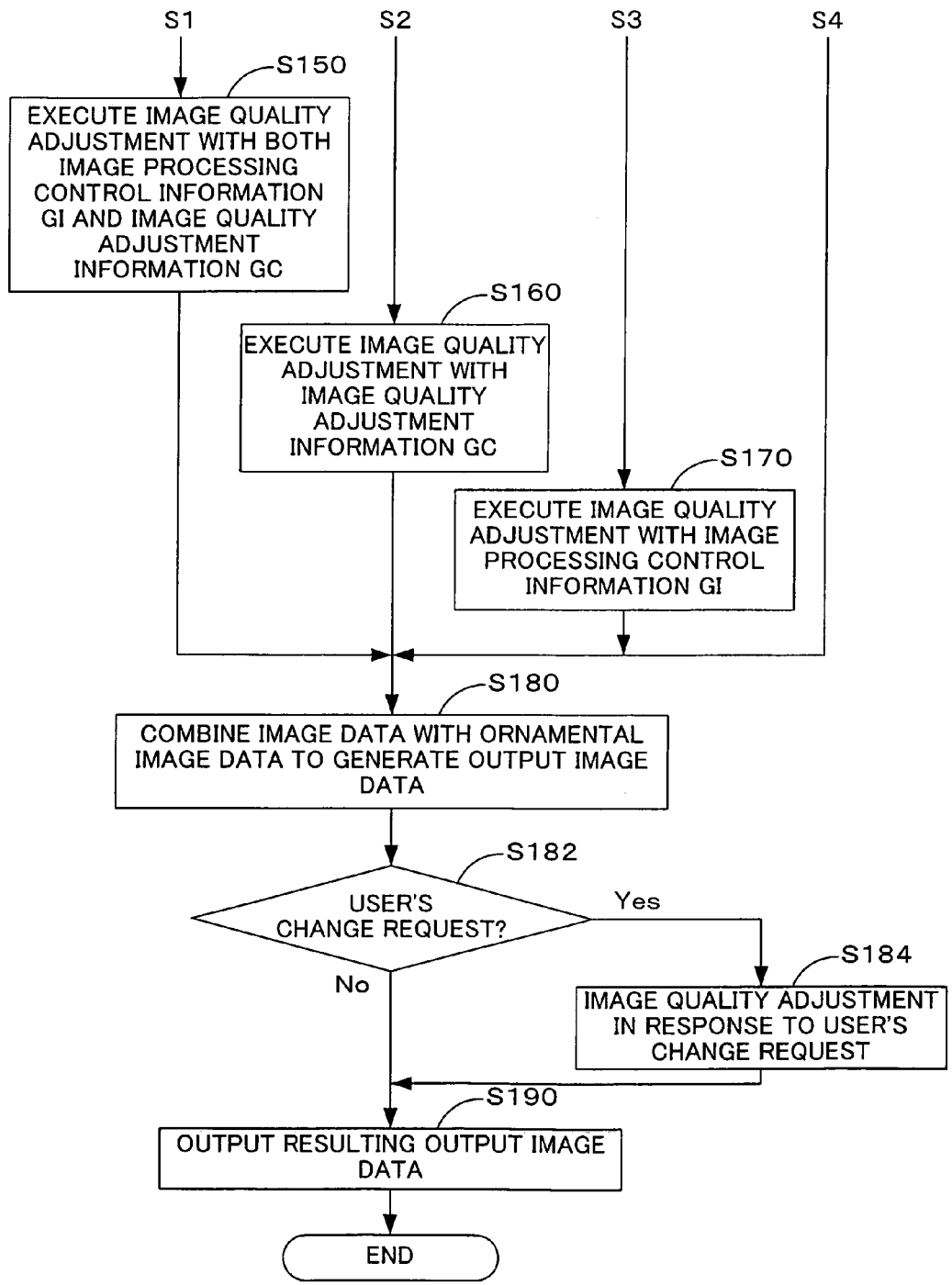
FIG. 4 is a flowchart showing continuation of the image processing routine executed by the personal computer 20 in the first embodiment.
Figure 5:
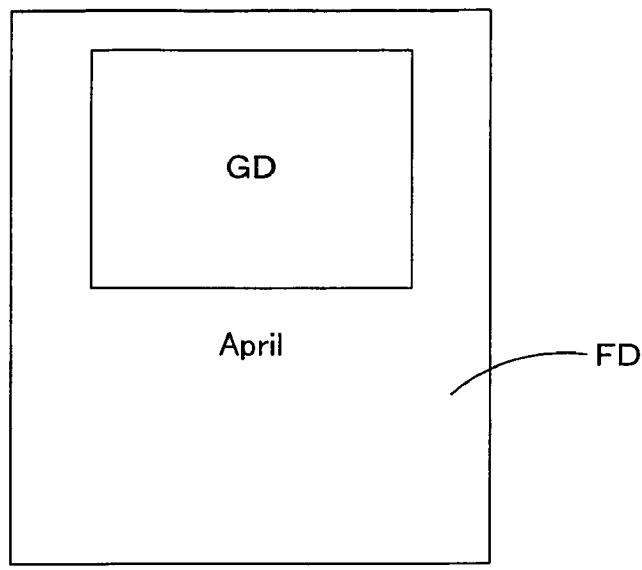
FIG. 5 shows an image of ornamental image data as an example.
Figure 6:
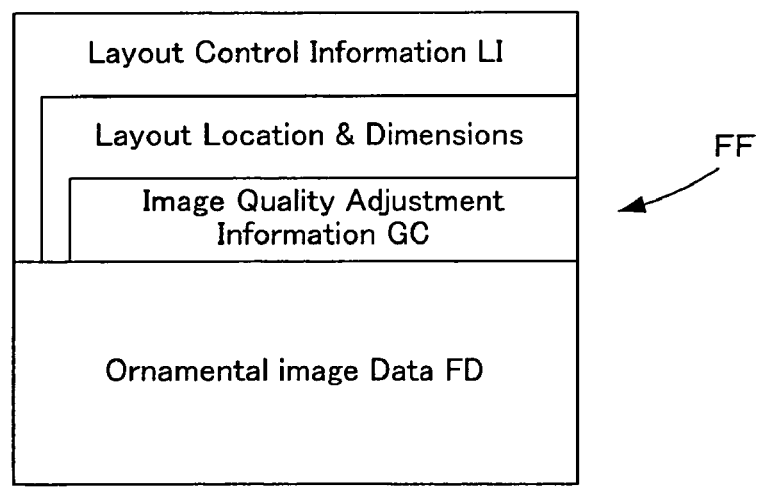
FIG. 6 shows the file structure of an ornamental image file FF including ornamental image data FD and layout control information LI.

A series of image processing executed by the personal computer 20 in the first embodiment is described below with reference to FIGS. 3 through 11. FIG. 3 is a flowchart showing an image processing routine executed by the personal computer 20 in the first embodiment. FIG. 4 is a flowchart showing continuation of the image processing routine executed by the personal computer 20 in the first embodiment. FIG. 5 shows an image of ornamental image data as an example. FIG. 6 shows the file structure of an ornamental image file FF including ornamental image data FD and layout control information LI. FIG. 7 shows the file structure of an image file including image data GD and image processing control information GI. FIG. 8 shows one example of image quality adjustment information GC according to the subject of the ornamental image data FD specified by the layout control information LI in the first embodiment. FIG. 9 shows another example of the image quality adjustment information GC according to the subject of the ornamental image data FD specified by the layout control information LI in the first embodiment. FIG. 10 shows one example of the image processing control information GI. FIG. 11 shows a combination table of the image processing control information GI and the image quality adjustment information GC in the first embodiment. The image of the ornamental image data FD conceptually shows the state of expansion on an image buffer. The file structure of each file conceptually shows the state of storage in a memory.

The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and temporarily stores the selected ornamental image data FD in the RAM 201 (step S100). The ornamental image data FD may be selected on the digital still camera 10, may be selected among a number of ornamental image data stored in advance in the HDD 202 of the personal computer 20 through the operations of the keyboard, or may be selected via a network. The ornamental image data FD may include plural layout locations to paste multiple image data GD thereon. In this embodiment, however, for the simplicity of explanation, it is assumed that single (one) image data GD is pasted on ornamental image data FD having only one layout location.

The ornamental image data FD gives some ornamental effect to an image and is, for example, a frame image data suitable for the subject of the image, such as the season and the event, a photo album (album mounting) image data, or illustration data. The ornamental image data FD has, for example, a form shown in FIG. 5 in a resulting output image (in expansion on an image buffer). The example of FIG. 5 shows a calendar frame, which is a frame suitable for the subject of the season and includes a layout location to paste image data GD thereon.

The ornamental image data FD is transmitted together with the layout control information LI in the form of an ornamental image file FF. The ornamental image file FF has, for example, the file structure of FIG. 6. The layout control information LI includes layout location information (for example, coordinate information) on the layout location to paste image data GD thereon, information regarding the layout dimensions (resized dimensions) of the image data GD on the layout location, and image quality adjustment information GC related to the image data GD to be pasted (see FIGS. 8 and 9).

The layout control information L1 further includes α channel data, which is used to regulate tone values (R, G, and B tone data) of upper image data (for example, ornamental image data FD) located on an upper side in a resulting composite image relative to those of lower image data (for example, image data GD) located on a lower side and thereby determine the transparency of the lower image data against the upper image data. For example, the α channel data applies a coefficient α to the R, G, and B tone data of the upper image data, while applying a coefficient (1-α) to the R, G, and B tone data of the lower image data. The α channel data set equal to 255 shows no appearance of the lower image data (opaque) in a resulting composite image, whereas the α channel data set equal to 0 shows perfect appearance of the lower image data (transparent) in a resulting composite image. Semi-transparent ornamental effects are given by setting the α channel data in a range of 0 to 255.

The CPU 200 then selects desired image data GD and temporarily stores the selected image data GD into the RAM 201 (step S110). The image data GD may be selected on the digital still camera 10 or on the personal computer 20 through the operations of the keyboard. The typical procedure first selects (determines) desired ornamental image data FD and subsequently selects desired image data to be pasted in the layout location of the ornamental image data GD.

Each image data GD may be related to image processing control information GI to form one image file GF as shown in FIG. 7. The image processing control information GI may be described in a header of the image data GD or may be related to the image data GD by third correlation data.

The CPU 200 retrieves the layout control information LI in the obtained ornamental image file FF (including the ornamental image data FD) to find image quality adjustment information GC. In the case of successful detection of the image quality adjustment information GC (step S120: Yes), the CPU 200 subsequently retrieves the obtained image file GF (including the image data GD) to find image processing control information GI (step S130).

In the case of successful detection of the image processing control information GI related to the obtained image data GD (step S130: Yes), the CPU 200 goes to a flow S1 in FIG. 4. In the case of failed detection of the image processing control information GI related to the obtained image data GD (step S130: No), the CPU 200 goes to a flow S2 in FIG. 4.

In the case of failed detection of the image quality adjustment information GC in the layout control information of the obtained ornamental image file FF (including the ornamental image data FD) (step S120: No), the CPU 200 subsequently retrieves the obtained image file GF (including the image data GD) to find the image processing control information GI (step S140).

In the case of successful detection of the image processing control information GI related to the obtained image data GD (step S140: Yes), the CPU 200 goes to a flow S3 in FIG. 4. In the case of failed detection of the image processing control information GI related to the obtained image data GD (step S140: No), the CPU 200 goes to a flow S4 in FIG. 4.

Referring to the flowchart of FIG. 4, in the flow S1, the CPU 200 executes image quality adjustment with both the image processing control information GI and the image quality adjustment information GC (step S150).

Examples of the image quality adjustment information GC are described with reference to FIGS. 8 and 9. In the example of FIG. 8, the 'season' is the subject of the ornamental image data FD, for example, the calendar frame shown in FIG. 5. The image quality adjustment information GC specifies settings of correction or correction tendencies with regard to image quality adjustment parameters, contrast, brightness, saturation (chroma), sharpness, and memory colors (flesh, green, and sky). For example, the memory colors (green and sky) are set to 'standard' in the ornamental image data FD of April, while being set to 'stronger' in the ornamental image data FD of July to enhance the green and the sky in the summer.

In the example of FIG. 9, the 'event' is the subject of the ornamental image data FD, for example, birthday, Christmas, firework, and wedding. The image quality adjustment information GC specifies settings of correction or correction tendencies with regard to image quality adjustment parameters, contrast, brightness, saturation, sharpness, memory colors (flesh, green, and sky), and noise removal. For example, in the image quality adjustment information GC related to the ornamental image data FD, which is taken in the dark environment under the subject of 'firework', the image quality adjustment parameter 'noise removal' is set ON. In the image quality adjustment information GC related to the ornamental image data FD, which is taken under the subject of 'wedding', the image quality adjustment parameter 'sharpness' is set to 'soft focus'.

The image processing control information GI shown in FIG. 10 specifies settings of correction or correction tendencies that are optimum for the shot in each of eleven shot modes with regard to the respective image quality adjustment parameters.

The image processing control information GI specifies the image processing conditions (image quality adjustment conditions) set corresponding to each shot mode, while the image quality adjustment information GC specifies the image processing conditions (image quality adjustment conditions) set corresponding to each subject of the ornamental image data FD. The image processing control information GI may be inconsistent with the image quality adjustment information GC. In the case of detection of both the information GI and the information GC, the information GI and the information GC may be combined adequately or may be used selectively.

In this embodiment, the CPU 200 refers to a combination table shown in FIG. 11 to combine the image processing control information GI with the image quality adjustment information GC. In the example of FIG. 11, the image processing control information GI and the image quality adjustment information GC are combined in the equal balance. The image processing control information GI may have priority over the image quality adjustment information GC or vice versa. After determining the composite settings of correction (combined correction tendencies) based on both the information GI and the information GC, the CPU 200 executes image quality adjustment of the selected image data GD with the composite settings of correction (combined correction tendencies).

The image quality adjustment with the image processing control information GI and the image quality adjustment information GC is described more in detail. The CPU 200 scans the image data GD in units of pixels and obtains statistical image values (characteristic values) representing the characteristics of the image data FD with regard to the image quality adjustment parameters, for example, the contrast, the sharpness, and the brightness. The personal computer 20 stores in advance preset reference values of the respective image quality adjustment parameters in the HDD 202. The CPU 200 determines correction rates of the respective image quality adjustment parameters to cancel out or at least reduce differences between the characteristic values and the preset reference values with regard to the image quality adjustment parameters.

The CPU 200 then modifies the correction rates with the composite settings of correction (combined correction tendencies) with regard to the respective image quality adjustment parameters, which are obtained from the image processing control information GI and the image quality adjustment information GC. Variation of the correction rates with the settings of correction gives modified correction rates.

The CPU executes image quality adjustment of each image data GD with the modified correction rates. The image quality adjustment uses tone curves (S curves) that correlate input levels to output levels of the RGB color components of the image data GD with regard to image quality adjustment parameters, for example, the shadowing, the highlighting, the brightness, the contrast, the color balance, and the memory color correction. The image quality adjustment with the tone curves modifies the tone curves of the RGB color components or the respective tone curves of the color components R, G, and B with the composite settings of correction (combined correction tendencies) with regard to the respective image quality adjustment parameters, which are obtained from the image processing control information GI and the image quality adjustment information GC.

A specific point for application of the modified correction rate is set experimentally on each tone curve with regard to each image quality adjustment parameter. The modified correction rate varies the value of the tone curve at the preset specific point and accordingly changes the input-output characteristic of the tone curve. Application of the corrected tone curves with regard to the respective color components R, G, and B to the image data GD makes the input-output conversion with regard to the respective color components R, G, and B of the image data GD and thereby gives the image quality-adjusted image data GD.

The determination of the correction rates with regard to the respective image quality adjustment parameters and the subsequent image quality adjustment (auto image quality adjustment) with the modified correction rates may be executed in the following manner. In the description below, reference values represent preset reference values with regard to the respective image quality adjustment parameters.

With regard to the parameters 'contrast', 'shadowing', and 'highlighting', the procedure detects a shadowing point and a highlighting point from the image data, determines correction rates to compensate for the differences from the reference values, modifies the correction rates, and extends histograms with the modified correction rates. The procedure also determines a correction rate corresponding to a standard deviation of luminance, modifies the correction rate, and modifies (corrects) the tone curve with the modified correction rate.

With regard to the parameter 'brightness', the procedure determines whether an image is dark (insufficient exposure) or bright (excess exposure) according to the computed luminance values of respective 14 divisional areas of image data, determines a correction rate to compensate for the difference from the reference value, modifies the correction rate, and modifies the tone curve with the modified correction rate.

With regard to the parameter 'color balance', the procedure analyzes histograms of the respective color components R, G, and B of the image data to determine deviations of color balance, determines correction rates to compensate for the differences from the reference values of the R, G, and B color components by referring to the tone curves of the R, G, and B color components, modifies the correction rates, and reduces the color seepage with the modified correction rates. It is preferable not to execute auto adjustment of the color balance in the case where the image quality adjustment information GC or the image processing control information GI specifies intentional color seepage.

With regard to the parameter 'saturation', the procedure analyzes a saturation distribution of image data, determines a correction rate to compensate for the difference from the preference value, modifies the correction rate, and enhances the saturation with the modified correction rate. The image data of the lower saturation gives the higher enhancement level of saturation.

With regard to the parameter 'sharpness', the procedure analyzes a distribution of edge enhancement against frequency of image data, determines an application level (correction rate) of unsharp mask to compensate for the difference from the reference value, modifies the correction rate, and applies an unsharp mask with the modified correction rate (modified application level) to implement the image quality adjustment. The reference value is set according to the frequency distribution. The higher frequency image data (for example, landscape) gives the smaller reference value, while the lower frequency image data (for example, portrait) gives the greater reference value. The application level of the unsharp mask depends upon the distribution of the edge enhancement. The image data having the greater indistinctiveness gives the greater application level.

In the flow S2, the CPU 200 executes image quality adjustment with the image quality adjustment information GC (step S160). The image quality adjustment of the image data GD is carried out with the settings of correction (correction tendencies) with regard to the image quality adjustment parameters specified in the image quality adjustment information GC. When the image quality adjustment information GC specifies reduction rates of the differences between the characteristic values and the reference values of the respective image quality adjustment parameters, that is, levels of auto image quality adjustment, the correction rates are modified according to the reduction rates specified in the image quality adjustment information GC. When the image quality adjustment information GC specifies the concrete settings of the respective image quality adjustment parameters, on the other hand, the settings may be used as the modified correction rates. Namely the procedure does not determine correction rates by the analysis of the image data GD but directly sets the image quality adjustment information GC to the modified correction rates. The image quality adjustment information GC gives the modified correction rates adequate for the subject of the ornamental image data FD.

In the flow S3, the CPU 200 executes image quality adjustment with the image processing control information GI (step S170). The image quality adjustment of the image data GD is carried out with the settings of correction (correction tendencies) with regard to the image quality adjustment parameters specified in the image processing control information GI. When the image processing control information GI specifies reduction rates of the differences between the characteristic values and the reference values of the respective image quality adjustment parameters, that is, levels of auto image quality adjustment, the correction rates are modified according to the reduction rates specified in the image processing control information GI. When the image processing control information GI specifies the concrete settings of the respective image quality adjustment parameters, on the other hand, the settings may be used as the modified correction rates. Namely the procedure does not determine correction rates by the analysis of the image data GD but directly sets the image processing control information GI to the modified correction rates. The image processing control information GI gives the modified correction rates reflecting the photographer's demands.

In the flow S4, the CPU 200 does not execute image quality adjustment of the image data.

The CPU 200 combines the image data GD with the ornamental image data FD according to the layout control information LI to generate resulting output image data (step S180). In the case of entry of any user's change request with regard to the image data GD, which has gone through the image quality adjustment with at least either of the image quality adjustment information GC and the image processing control information GI or has not gone through any image quality adjustment (step S182: Yes), the CPU 200 changes the image data GD according to the user's requirement (step S184) and goes to step S190. The user's change request is entered, for example, through the operation of the input device, such as the keyboard or the mouse, connected to the personal computer 20. The change request is, for example, to change the layout location of image data or to modify the result of the image quality adjustment of the image data. The image data may be relocated in response to the user's requirement.

One typical method of combining the image data GD with the ornamental image data FD is described. The CPU 200 interprets the script of the layout control information LI describing the layout location and the layout dimensions, determines the location and the dimensions of the image data GD to be laid out on the ornamental image data FD based on the result of the interpretation, specifies the tone values of the ornamental image data FD according to the α channel data, and combines the image data GD with the ornamental image data FD. The CPU 200 resizes (contracts or expands) the dimensions of the image data GD according to the layout dimensions of the layout location described in the script.

The CPU 200 applies the α channel data and sums up the R, G, and B values of the respective image data to calculate the R, G, and B values of resulting output image data. The α channel data is set equal to 0 to prevent interference of the ornamental image data FD with reproduction of the image data GD in the area of an image in a resulting output image (composite image). The α channel data is set equal to 255 to prohibit reproduction of the image data GD in the area of an ornamental image (an ornamental area or a frame area) in the resulting output image.

The CPU 200 outputs resulting output image data to a printer driver or a display driver (step S190) and terminates this image processing routine. The printer driver executes RGB to CMYK color conversion based on lookup tables, halftoning, and other required series of image processing and eventually sends the output image data with print control commands as raster data to the printer 30.

As described above, the personal computer 20 as the image processing device of the first embodiment executes image quality adjustment of the image data GD, which is to be pasted on the ornamental image data FD, with the image quality adjustment information GC included in the layout control information LI of the ornamental image data FD. The image quality adjustment information GC specifies the settings of correction or the correction tendencies of the image data GD according to the concept and the subject of the ornamental image data FD. The result of the image quality adjustment of the image data GD accordingly well agrees with, is well matched with, or well suits the concept and the subject of the ornamental image data FD. The resulting output image accordingly gives good impression.

When the image data GD is related to the image processing control information GI representing the image processing conditions, the image quality adjustment is executed with the combination of the settings of correction (correction tendencies) specified by the image processing control information GI with the settings of correction (correction tendencies) specified by the image quality adjustment information GC. This arrangement ensures adequate image quality adjustment of the image data GD according to both the shot mode and the concept and the subject of the ornamental image data FD. The output result gives a well-balanced, impressive composite image of the objective image and the ornamental image.

Second Embodiment

Figures 12, 13:
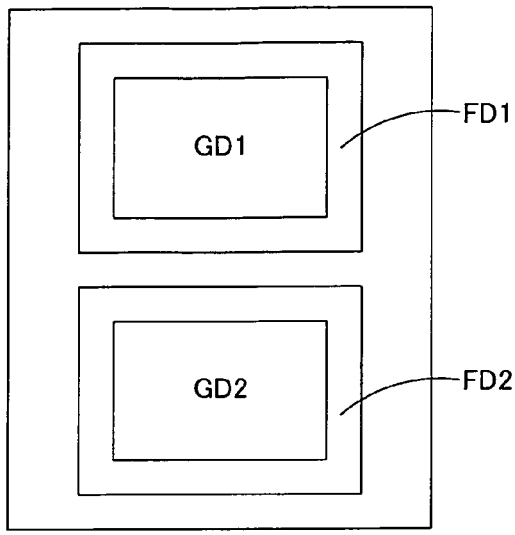
FIG. 12 shows an output result of output unit data in a second embodiment.
FIG. 13 shows one example of image quality adjustment information GC specified with regard to respective ornamental image data FD in the second embodiment.

A series of image processing executed by the personal computer 20 in a second embodiment is described with reference to FIGS. 12 and 13. FIG. 12 shows an output result of output unit data in the second embodiment. FIG. 13 shows one example of image quality adjustment information GC specified with regard to respective ornamental image data FD in the second embodiment. The configuration of the image processing system in the second embodiment including the structure of the personal computer 20 is identical with the configuration of the image processing system of the first embodiment. The like elements are thus expressed by the like numerals and are not specifically described here. The output result of the output unit data shown in FIG. 12 represents a conceptual image of image data GD and ornamental image data FD expanded on an image buffer or an output image on an output medium.

The first embodiment describes image quality adjustment of the image data GD, which is pasted on the ornamental image data, with the image processing control information GI and the image quality adjustment information GC without specifically taking into account the unit of each print job. In the structure of the second embodiment, on the other hand, one print job may include multiple ornamental image data FD1 and FD2, and different settings of the image quality adjustment information GC may be applied to image data GD1 and GD2, which are respectively pasted on the ornamental image data FD1 and FD2.

When one print job includes multiple ornamental image data FD1 and FD2 as shown in FIG. 12, different settings of the image quality adjustment information GC corresponding to the respective ornamental image data FD1 and FD2 are applied to the respective image data GD1 and GD2. The image quality adjustment of the image data GD to be pasted is accordingly controlled by the image quality adjustment information GC included in the layout control information LI of the ornamental image data FD as pasting objects.

MODIFIED EXAMPLES (1) In the first and the second embodiments discussed above, the procedure analyzes image data GD, determines correction rates with regard to the respective image quality adjustment parameters, modifies the correction rates based on the image processing control information GI and the image quality adjustment information GC, and executes image quality adjustment with the modified correction rates. One possible modification may execute image quality adjustment with the image processing control information GI and the image quality adjustment information GC without analyzing the image data GD. The tone curves of the RGB color components or the tone curves of the respective color components R, G, and B are modified with the composite settings of correction (correction tendencies) with regard to the respective image quality adjustment parameters, which are obtained from the image processing control information GI and the image quality adjustment information GC.

(2) Image quality adjustment may be executed with the settings of correction of the respective image quality adjustment parameters. Here the reference values represent preset reference values of the image quality adjustment parameters.

With regard to the parameters 'contrast', 'shadowing', and 'highlighting', the histograms are extended with the composite settings of correction. The tone curve is varied (modified) with the composite setting of correction.

With regard to the parameter 'brightness', the tone curve is modified with the composite setting of correction.

With regard to the parameter 'color balance', the composite settings of correction are applied to the respective tone curves of the R, G, and B color components to reduce color seepage.

With regard to the parameter 'saturation', the composite setting of correction is applied to enhance the saturation.

With regard to the parameter 'sharpness', an unsharp mask is applied with the composite setting of correction (application level) to implement image quality adjustment.

In this modified example, the image quality adjustment of the image data GD is directly controlled by the image quality adjustment information GC included in the layout control information LI. This ensures adequate image quality adjustment of the image data GD according to the ornamental image data or the subject of the ornamental image data FD.

Figure 14:
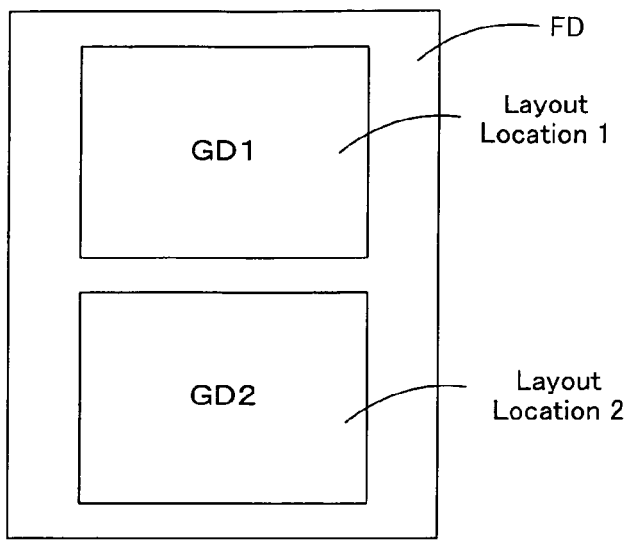
FIG. 14 shows an image of ornamental image data FD having plural layout locations to receive image data pasted therein.
Figure 15:
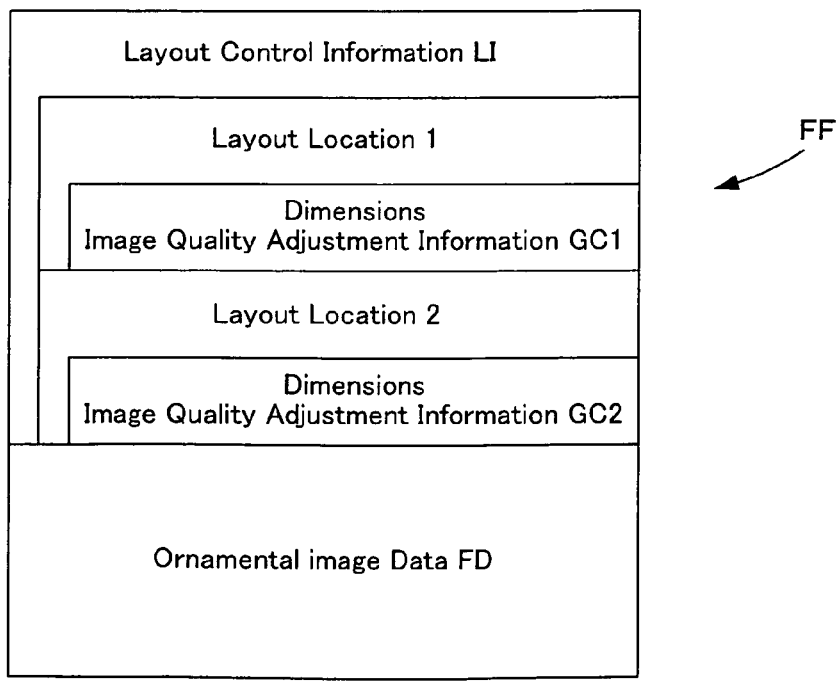
FIG. 15 shows the file structure of an ornamental image file FF including layout control information LI related to multiple image data GD.

In the description of the first embodiment, it is assumed that one image data GD is laid out on one ornamental image data. As shown in FIGS. 14 and 15, multiple image data GD1 and GD2 may be laid out on one ornamental image data having multiple layout locations 1 and 2. FIG. 14 shows an image of ornamental image data FD having plural layout locations to receive image data pasted therein. FIG. 15 shows the file structure of an ornamental image file FF including layout control information LI related to multiple image data GD.

In this modified example, pieces of image quality adjustment information GC1 and GC2 are specified independently corresponding to the respective layout locations 1 and 2. Such specification ensures independent image quality adjustment of the respective image data GD1 and GD2 pasted in the respective layout locations of the ornamental image data FD.

In the embodiments discussed above, the image processing device may be a digital still camera. In this case, composite image data including subject image data integrated with ornamental image data may be output as subject image data. For example, when a frame with a certain character image is used as ornamental image data, an objective image integrated with the certain character image is given as a composite image.

Third Embodiment

Figure 16:
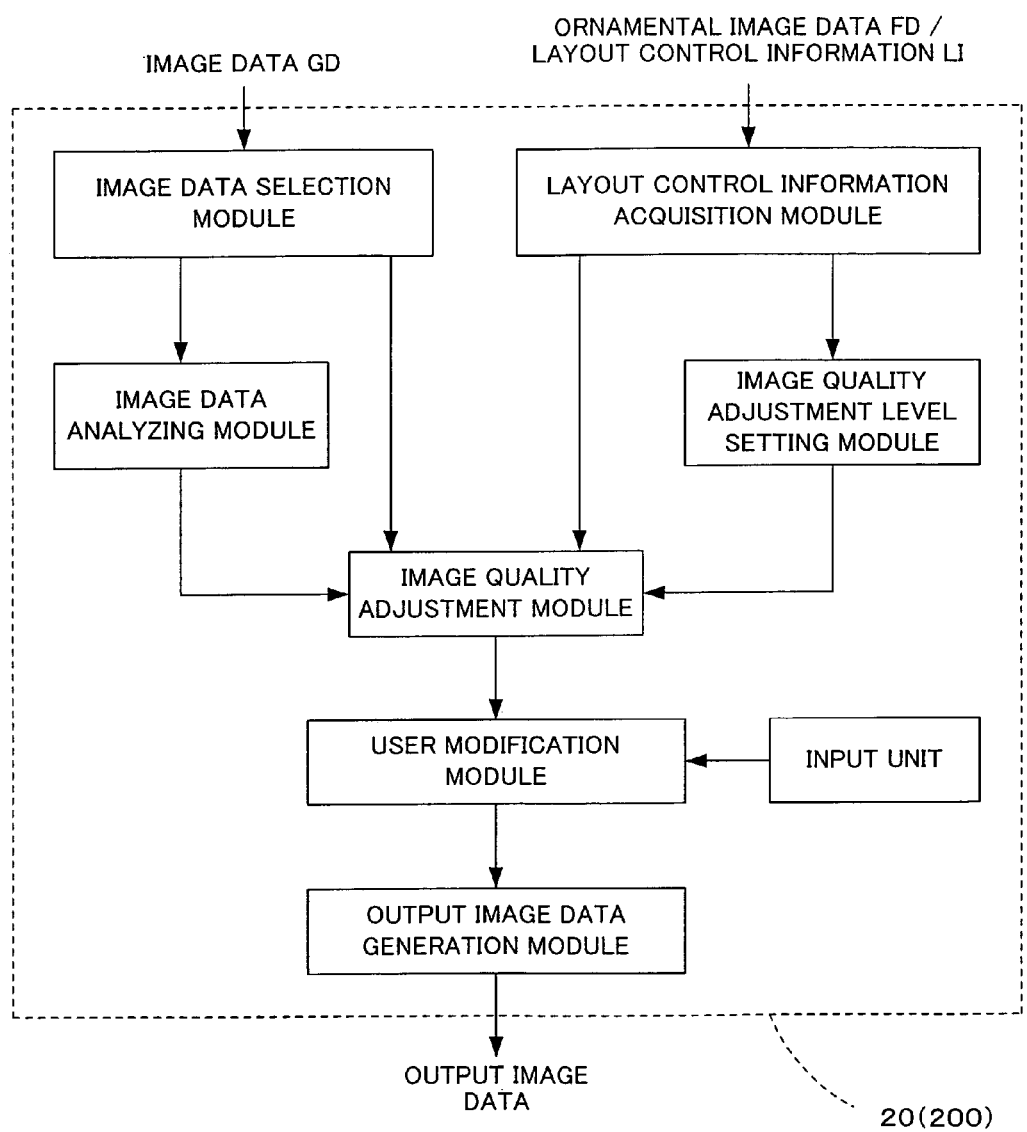
FIG. 16 is a functional block diagram showing the functions of the personal computer 20 (CPU 200) in a third embodiment.

The functional configuration of the personal computer 20 (CPU 200) in a third embodiment is described with reference to FIG. 16. FIG. 16 is a functional block diagram showing the functions of the personal computer 20 (CPU 200) in the third embodiment. The layout control information LI used in the third and subsequent embodiments specifies not only the layout locations and the layout dimensions of image data GD laid out on ornamental image data FD but the settings of correction and the correction levels of the image data GD laid out in the respective layout locations and the priorities of the respective layout locations.

The personal computer 20 (CPU 200) includes an image data selection module that selects multiple image data GD, which are to be pasted on ornamental image data, among plurality of input image data GD, and an image data analyzing module that analyzes the selected image data GD to obtain characteristic values of image quality adjustment parameters representing the image quality characteristics of the image data GD. The CPU 200 also includes a layout control information acquisition module that obtains layout control information LI from selected ornamental image data FD, and an image quality adjustment level setting module that sets image quality adjustment levels of the respective image data GD according to the obtained layout control information LI.

The CPU 200 further includes an image quality adjustment module that executes image quality adjustment of the respective image data GD selected by the image data selection module according to the results of the analysis by the image data analyzing module, the layout control information LI, and the image quality adjustment levels set by the image quality adjustment level setting module. The CPU 200 also includes an output image data generation module that pastes each image data GD, which has gone through the image quality adjustment by the image quality adjustment module, on the ornamental image data FD according to the layout control information LI and generates resulting output image data. The CPU 200 further includes a user modification module that modifies the image quality, which has been adjusted according to the results of the analysis by the image data analyzing module, the layout control information LI, and the settings of the image quality adjustment levels, in response to the user's demands input via an input unit. The user modification module also changes the layout location and the layout dimensions of each image data GD pasted on the ornamental image data FD according to the layout control information LI, in response to the user's requirements.

Figure 17:
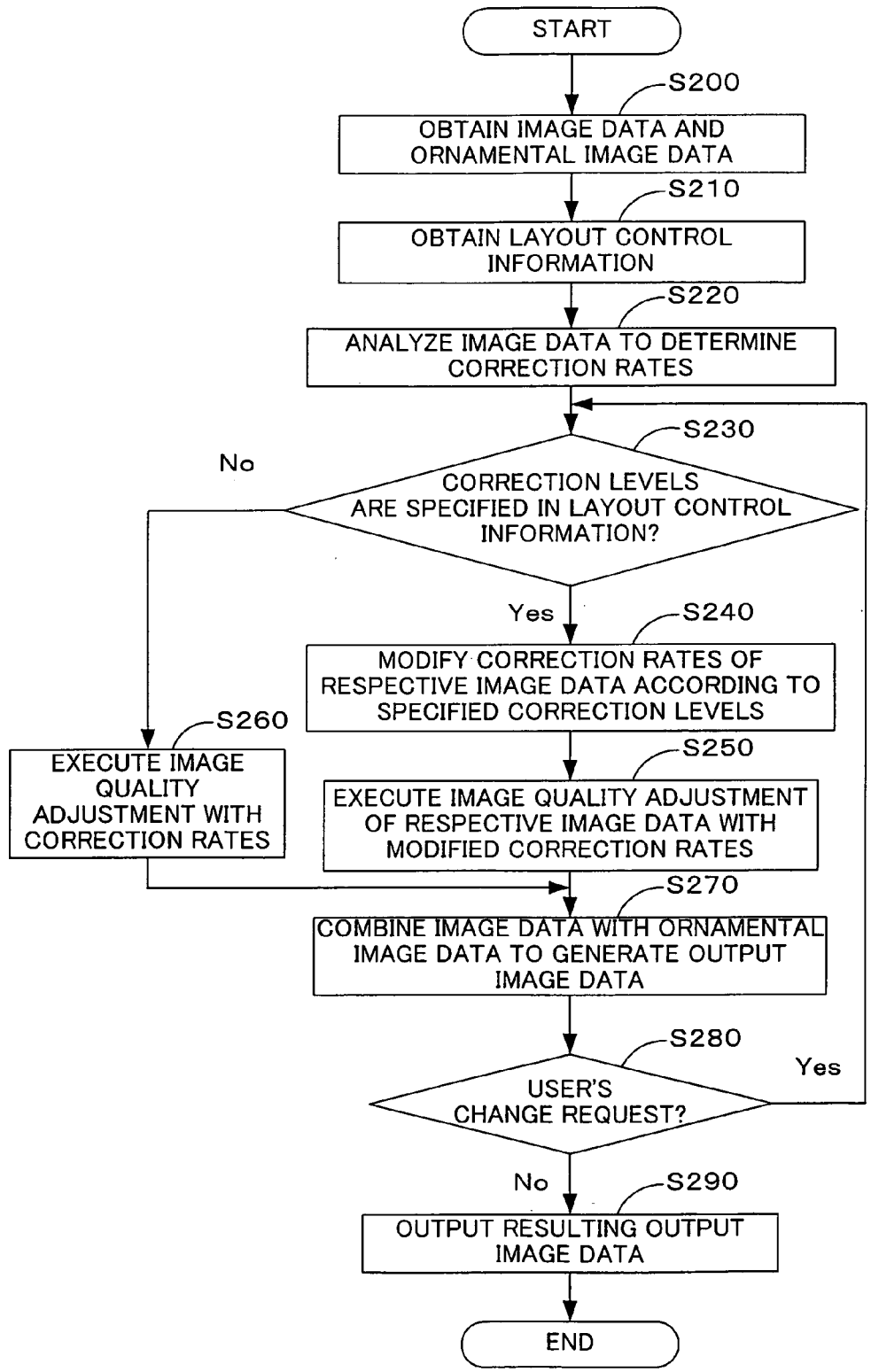
FIG. 17 is a flowchart showing an image processing routine executed by the personal computer 20 in the third embodiment.
Figure 18:
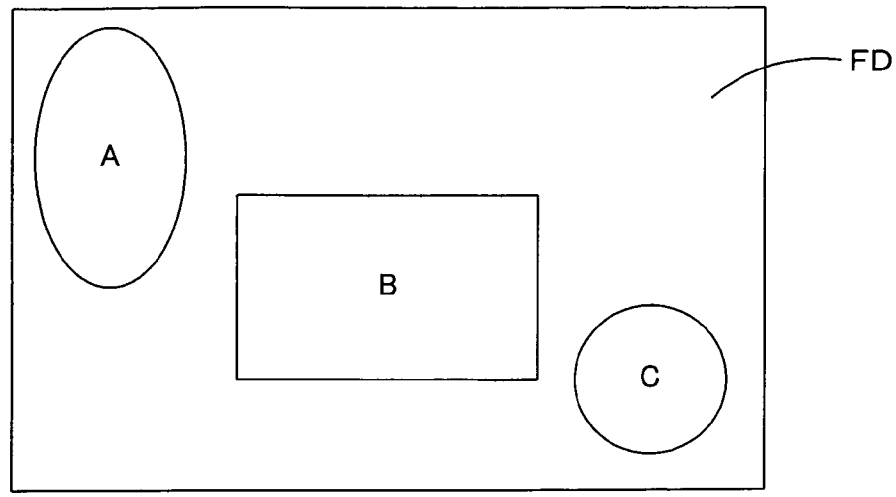
FIG. 18 shows layout locations and layout dimensions of image data on ornamental image data.
Figure 19:
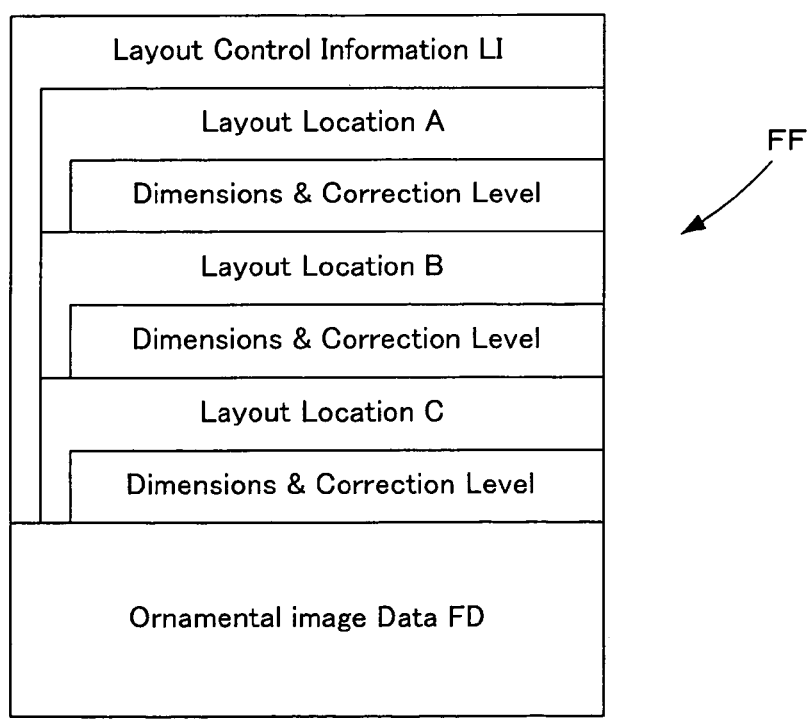
FIG. 19 shows the file structure of an ornamental image file FF including ornamental image data FD and layout control information LI.
Figures 20, 21:
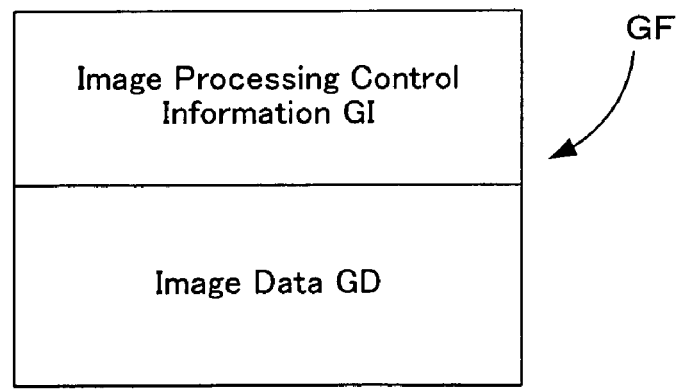
FIG. 20 shows settings of correction level corresponding to respective layout locations specified by the layout control information LI in the third embodiment.
FIG. 21 shows the file structure of an image file including image data GD and image processing control information GI.

A series of image processing executed by the personal computer 20 in the third embodiment is described below with reference to FIGS. 17 through 21. FIG. 17 is a flowchart showing an image processing routine executed by the personal computer 20 in the third embodiment. FIG. 18 shows layout locations and layout dimensions of image data on ornamental image data. FIG. 19 shows the file structure of an ornamental image file FF including ornamental image data FD and layout control information LI. FIG. 20 shows settings of correction level corresponding to respective layout locations specified by the layout control information LI in the third embodiment. FIG. 21 shows the file structure of an image file including image data GD and image processing control information GI. The layout locations of the image data on the ornamental image data FD conceptually shows the state of expansion on an image buffer. The file structure of each file conceptually shows the state of storage in a memory.

The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and multiple image data GD and temporarily stores the selected ornamental image data FD and the selected multiple image data GD in the RAM 201 (step S200). The ornamental image data FD may be selected on the digital still camera 10, may be selected among a number of ornamental image data stored in advance in the HDD 202 of the personal computer 20 through the operations of the keyboard, or may be selected via a network. The image data GD may be selected on the digital still camera 10 or on the personal computer 20 through the operations of the keyboard. The typical procedure first selects (determines) desired ornamental image data FD and subsequently selects plurality of desired image data to be pasted in the layout locations of the ornamental image data GD.

The ornamental image data FD gives some ornamental effect to an image and is, for example, a photo frame image data, a photo album (album mounting) image data, or illustration data. The ornamental image data FD has a form shown in FIG. 18 in a resulting output image (in expansion on an image buffer) and includes three layout locations A to C, on which image data are pasted. The ornamental image data FD is transmitted together with the layout control information LI in the form of an ornamental image file FF. The ornamental image file FF has, for example, the file structure of FIG. 19. The layout control information LI includes layout location information (for example, coordinate information) on the respective layout locations A to C for layout of image data GD and information regarding the layout dimensions (resized dimensions) and correction levels of the respective image data to be pasted in the respective layout locations A to C. The correction levels are set according to the layout locations on the ornamental image data FD and the areas of the respective layout locations. For example, a higher correction level is set to a layout location closer to the center of the ornamental image data or a layout location having a larger area.

The layout control information L1 further includes α channel data, which is used to regulate tone values (R, G, and B tone data) of upper image data (for example, ornamental image data FD) located on an upper side in a resulting composite image relative to those of lower image data (for example, image data GD) located on a lower side and thereby determine the transparency of the lower image data against the upper image data. For example, the α channel data applies a coefficient α to the R, G, and B tone data of the upper image data, while applying a coefficient (1-α) to the R, G, and B tone data of the lower image data. The α channel data set equal to 255 shows no appearance of the lower image data (opaque) in a resulting composite image, whereas the α channel data set equal to 0 shows perfect appearance of the lower image data (transparent) in a resulting composite image. Semi-transparent ornamental effects are given by setting the α channel data in a range of 0 to 255.

The CPU 200 subsequently obtains the layout control information LI from the ornamental image file FF (step S210) and analyzes each of the selected multiple image data GD to set correction rates (step S220). The description now regards the process of setting the correction rates, that is, auto image quality adjustment levels.

The CPU 200 scans each image data GD in units of pixels and obtains statistical image values (characteristic values) representing the characteristics of the image data FD with regard to the image quality adjustment parameters, for example, the contrast, the sharpness, and the brightness. The personal computer 20 stores in advance preset reference values of the respective image quality adjustment parameters in the HDD 202. The CPU 200 determines correction rates of the respective image quality adjustment parameters to cancel out or at least reduce differences between the characteristic values and the preset reference values with regard to the image quality adjustment parameters.

When the image data FD is related to the image processing control information GI, the correction rates may be set based on the image processing control information GI. The image data GD may be related to the image processing control information GI to form one image file GF as shown in FIG. 21. The image processing control information GI may be described in a header of the image data GF or may be related to the image data GD by third correlation data. When the image processing control information GI specifies reduction rates of the differences between the characteristic values and the reference values of the respective image quality adjustment parameters, that is, levels of auto image quality adjustment, the correction rates are set according to the reduction rates specified in the image processing control information GI, instead of preset reduction rates. When the image processing control information GI specifies the concrete settings of the respective image quality adjustment parameters, on the other hand, the settings may be used as the correction rates. The image processing control information GI gives the correction rates reflecting the photographer's demands.

The CPU 200 determines whether the obtained layout control information LI specifies correction levels (step S230). The concrete procedure retrieves the layout control information LI to find a correction level specification tag. When the correction levels are specified in the obtained layout control information LI (step S230: Yes), the CPU 200 modifies the correction rates of the respective image data according to the specified correction levels to determine modified correction rates (step S240).

In the third embodiment, the correction levels are set to the respective layout locations, for example, as shown in FIG. 20. The modified correction rates of the image data in the layout location A are 80% of the correction rates. The modified correction rates of the image data in the layout location B are 100% of the correction rates. The modified correction rates of the image data in the layout location C are 70% of the correction rates. As clearly understood from FIG. 18, the layout location B is placed in a center area of the ornamental image data LD and occupies the largest area, thus being most conspicuous. In this embodiment, the layout control information LI sets 100% to the correction level of the layout location B to be higher than those of the other layout locations A and C. The image data pasted in the layout location B is accordingly more conspicuous than the image data pasted in the other layout locations A and C.

The CPU executes image quality adjustment of each image data GD with the modified correction rates (step S250). The image quality adjustment uses tone curves (S curves) that correlate input levels to output levels of the RGB color components of the image data GD with regard to image quality adjustment parameters, for example, the shadowing, the highlighting, the brightness, the contrast, the color balance, and the memory color correction. In the image quality adjustment with the tone curves, a correction rate of each image quality adjustment parameter is used to vary the corresponding tone curves of the R, G, and B color components. A specific point for application of the modified correction rate is set experimentally on each tone curve with regard to each image quality adjustment parameter. The modified correction rate varies the value of the tone curve at the preset specific point and accordingly changes the input-output characteristic of the tone curve. Application of the corrected tone curves with regard to the respective color components R, G, and B to the image data GD makes the input-output conversion with regard to the respective color components R, G, and B of the image data GD and thereby gives the image quality-adjusted image data GD.

The determination of the correction rates with regard to the respective image quality adjustment parameters and the subsequent image quality adjustment (auto image quality adjustment) with the modified correction rates may be executed in the following manner. In the description below, reference values represent preset reference values with regard to the respective image quality adjustment parameters.

With regard to the parameters 'contrast', 'shadowing', and 'highlighting', the procedure detects a shadowing point and a highlighting point from the image data, determines correction rates to compensate for the differences from the reference values, modifies the correction rates, and extends histograms with the modified correction rates. The procedure also determines a correction rate corresponding to a standard deviation of luminance, modifies the correction rate, and modifies (corrects) the tone curve with the modified correction rate.

With regard to the parameter 'brightness', the procedure determines whether an image is dark (insufficient exposure) or bright (excess exposure) according to the computed luminance values of respective 14 divisional areas of image data, determines a correction rate to compensate for the difference from the reference value, modifies the correction rate, and modifies the tone curve with the modified correction rate.

With regard to the parameter 'color balance', the procedure analyzes histograms of the respective color components R, G, and B of the image data to determine deviations of color balance, determines correction rates to compensate for the differences from the reference values of the R, G, and B color components by referring to the tone curves of the R, G, and B color components, modifies the correction rates, and reduces the color seepage with the modified correction rates. It is preferable not to execute auto adjustment of the color balance in the case where the image processing control information GI specifies intentional color seepage.

With regard to the parameter 'saturation', the procedure analyzes a saturation distribution of image data, determines a correction rate to compensate for the difference from the preference value, modifies the correction rate, and enhances the saturation with the modified correction rate. The image data of the lower saturation gives the higher enhancement level of saturation.

With regard to the parameter 'sharpness', the procedure analyzes a distribution of edge enhancement against frequency of image data, determines an application level (correction rate) of unsharp mask to compensate for the difference from the reference value, modifies the correction rate, and applies an unsharp mask with the modified correction rate (modified application level) to implement the image quality adjustment. The reference value is set according to the frequency distribution. The higher frequency image data (for example, landscape) gives the smaller reference value, while the lower frequency image data (for example, portrait) gives the greater reference value. The application level of the unsharp mask depends upon the distribution of the edge enhancement. The image data having the greater indistinctiveness gives the greater application level.

When the correction levels are not specified in the obtained layout control information LI (step S230: No), on the other hand, the CPU 200 executes the image quality adjustment with the correction rates as described previously (step S260).

On completion of the image quality adjustment with the modified correction rates (step S250) or the image quality adjustment with the correction rates (step S260), the CPU 200 combines the image data GD with the ornamental image data FD according to the layout control information LI to generate resulting output image data (step S270).

One typical method of combining the image data GD with the ornamental image data FD is described. The CPU 200 interprets the script of the layout control information LI describing the layout locations and the layout dimensions, determines the locations and the dimensions of the image data GD to be laid out on the ornamental image data FD based on the result of the interpretation, specifies the tone values of the ornamental image data FD according to the α channel data, and combines the image data GD with the ornamental image data FD. The CPU 200 resizes (contracts or expands) the dimensions of the image data GD according to the layout dimensions of the respective layout locations described in the script.

The CPU 200 applies the α channel data and sums up the R, G, and B values of the respective image data to calculate the R, G, and B values of resulting output image data. The α channel data is set equal to 0 to prevent interference of the ornamental image data FD with reproduction of the image data GD in the area of an image in a resulting output image (composite image). The α channel data is set equal to 255 to prohibit reproduction of the image data GD in the area of an ornamental image (an ornamental area or a frame area) in the resulting output image.

The CPU 200 determines whether any user's change request is entered from the input device, such as a keyboard or a mouse (step S280). In the case of no entry of the user's change request (step S280: No), the program goes to step S190.

In the case of any entry of the user's change request (step S280: Yes), on the other hand, the CPU 200 changes the selection of the image data and the layout locations of the selected image data according to the user's requirements and repeats the processing of steps S230 and S270. The user's demands are accordingly reflected on the selection of the image data to be laid out in the ornamental image data and the layout locations of the image data in the ornamental image data.

The CPU 200 outputs resulting output image data to a printer driver or a display driver (step S290) and terminates this image processing routine. The printer driver executes RGB to CMYK color conversion based on lookup tables, halftoning, and other required series of image processing and eventually sends the output image data with print control commands as raster data to the printer 30.

As described above, the personal computer 20 as the image processing device of the third embodiment varies the correction rates of the image data GD, which are to be pasted in the respective layout locations of the ornamental image data FD, according to the correction levels specified in the layout control information LI. The layout control information LI is thus utilized to vary the degrees of image quality adjustment of the image data GD according to the layout locations and thereby change the impression of the image data GD pasted in the respective layout locations. One typical method of varying the degrees of image quality adjustment of the image data GD according to the layout locations gives the highest image quality (the greatest impression) to key image data.

The key image data is generally located about the center of the image data GD and has large layout dimensions. The image quality of the key image data is thus more conspicuous than those of the other image data. Setting the higher degree of image quality adjustment to the key image data is thus advantageous.

Fourth Embodiment

Figure 22:
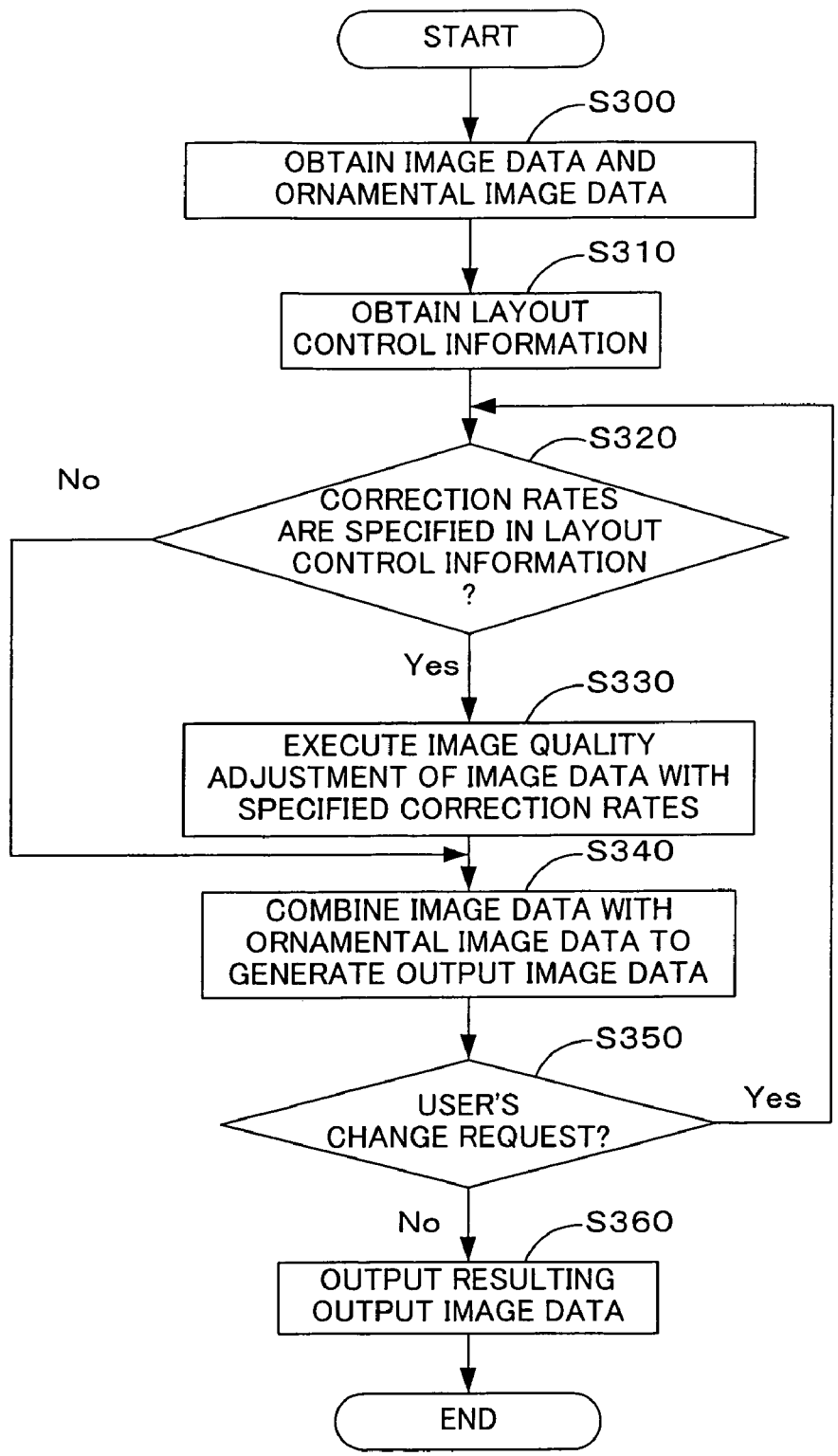
FIG. 22 is a flowchart showing an image processing routine executed by the personal computer in a fourth embodiment.

A series of image processing executed by the personal computer in a fourth embodiment is described below with reference to FIGS. 22 and 23. FIG. 22 is a flowchart showing an image processing routine executed by the personal computer in the fourth embodiment. FIG. 23 shows settings of correction corresponding to respective layout locations specified by the layout control information LI in the fourth embodiment. The structure of the personal computer in the fourth embodiment is identical with the structure of the personal computer 20 in the first embodiment. The like elements are thus expressed by the like numerals and are not specifically described here.

The image processing executed by the personal computer 20 in the fourth embodiment is described below.

The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and multiple image data GD and temporarily stores the selected ornamental image data FD and the selected multiple image data GD in the RAM 201 (step S300). The ornamental image data FD may be selected on the digital still camera 10, may be selected among a number of ornamental image data stored in advance in the HDD 202 of the personal computer 20 through the operations of the keyboard, or may be selected via a network. The image data GD may be selected on the digital still camera 10 or on the personal computer 20 through the operations of the keyboard. The typical procedure first selects (determines) desired ornamental image data FD and subsequently selects plurality of desired image data to be pasted in the layout locations of the ornamental image data GD.

The definition and the form of the ornamental image data FD are described above. In the fourth embodiment, for example, the layout control information LI specifies settings of correction for respective layout locations A to C as shown in FIG. 23. The settings of correction depend upon the layout locations on the ornamental image data FD and the areas of the respective layout locations. For example, greater correction rates are set to a layout location closer to the center of the ornamental image data FD and a layout location having a greater area. The layout control information LI also includes script of α channel data as described previously.

The CPU 200 obtains layout control information LI from the ornamental image file FF (step S310) and determines whether the obtained layout control information LI has settings of correction rates (step S320). The concrete procedure retrieves the layout control information LI to find a correction rate specification tag. When the correction rates are specified in the obtained layout control information LI (step S320: Yes), the CPU 200 executes image quality adjustment of each image data GD with the specified settings of correction rates.

In the fourth embodiment, for example, the correction rates of the respective image quality adjustment parameters are set as shown in FIG. 23 with regard to the respective layout locations in the ornamental image data FD shown in FIG. 18. In the illustrated example of FIG. 23, the correction rates are expressed by easily comprehensible sensory terms, which are related in advance to numerical values. The correction rates may alternatively be expressed by numerical values. The correction rate 'standard' is set to all the parameters, that is, the contrast, the brightness, the saturation, and the sharpness, with regard to the image data in the layout location A. The correction rate 'stronger' is set to the contrast parameter, the correction rate 'higher' is set to the saturation and the sharpness parameters, and the correction rate 'standard' is set to the brightness parameter, with regard to the image data in the layout location B. The correction rate 'standard' is set to the contrast, the saturation, and the sharpness parameters, and the correction rate 'darker' is set to the brightness parameter, with regard to the image data in the layout location C.

As clearly understood from FIG. 18, the layout location B is placed in the center area of the ornamental image data LD and occupies the largest area, thus being most conspicuous. In this embodiment, the layout control information LI sets the greater correction rates to the layout location B, while setting the smaller correction rates to the other layout locations A and C. The image data pasted in the layout location B accordingly gives a more conspicuous image of the stronger contrast and the higher saturation and sharpness, compared with the image data pasted in the other layout locations A and C.

The image quality adjustment with the specified correction rates is carried out basically with the tone curves as described in the third embodiment.

When the correction rates are not specified in the obtained layout control information LI (step S320: No), the CPU 200 does not execute image quality adjustment of the image data.

On completion of the image quality adjustment with the specified correction rates (step S330) or immediately after step S320 in the case of no execution of image quality adjustment, the CPU 200 combines the image data GD with the ornamental image data FD according to the layout control information LI to generate resulting output image data (step S340).

The combination of the image data GD with the ornamental image data FD according to the layout control information LI is implemented by the procedure described in the third embodiment. The CPU 200 then determines whether any user's change request is entered from the input device, such as a keyboard or a mouse (step S350). In the case of no entry of the user's change request (step S350: No), the program goes to step S360.

In the case of any entry of the user's change request (step S350: Yes), on the other hand, the CPU 200 changes the selection of the image data and the layout locations of the selected image data according to the user's requirements and repeats the processing of steps S320 and S340. The user's demands are accordingly reflected on the selection of the image data to be laid out in the ornamental image data and the layout locations of the image data in the ornamental image data.

The CPU 200 outputs resulting output image data to the printer 30 (printer driver) or the display 25 (step S360) and terminates this image processing routine.

As described above, the personal computer 20 as the image processing device of the fourth embodiment executes image quality adjustment of the image data GD, which are to be pasted in the respective layout locations of the ornamental image data FD, with the correction rates specified in the layout control information LI. The layout control information LI is utilized to vary the degrees of image quality adjustment of the image data GD according to the layout locations and thereby change the impression of the image data GD pasted in the respective layout locations. The concrete procedure raises the correction rates of key image data with regard to at least one of the contrast, the brightness, the saturation, and the sharpness parameters to improve the impression of a resulting output image corresponding to the key image data.

The key image data is generally located about the center of the image data GD and has large layout dimensions. The image quality of the key image data is thus more conspicuous than those of the other image data. Raising the correction rates of the key image data is thus advantageous.

Fifth Embodiment

Figure 24:
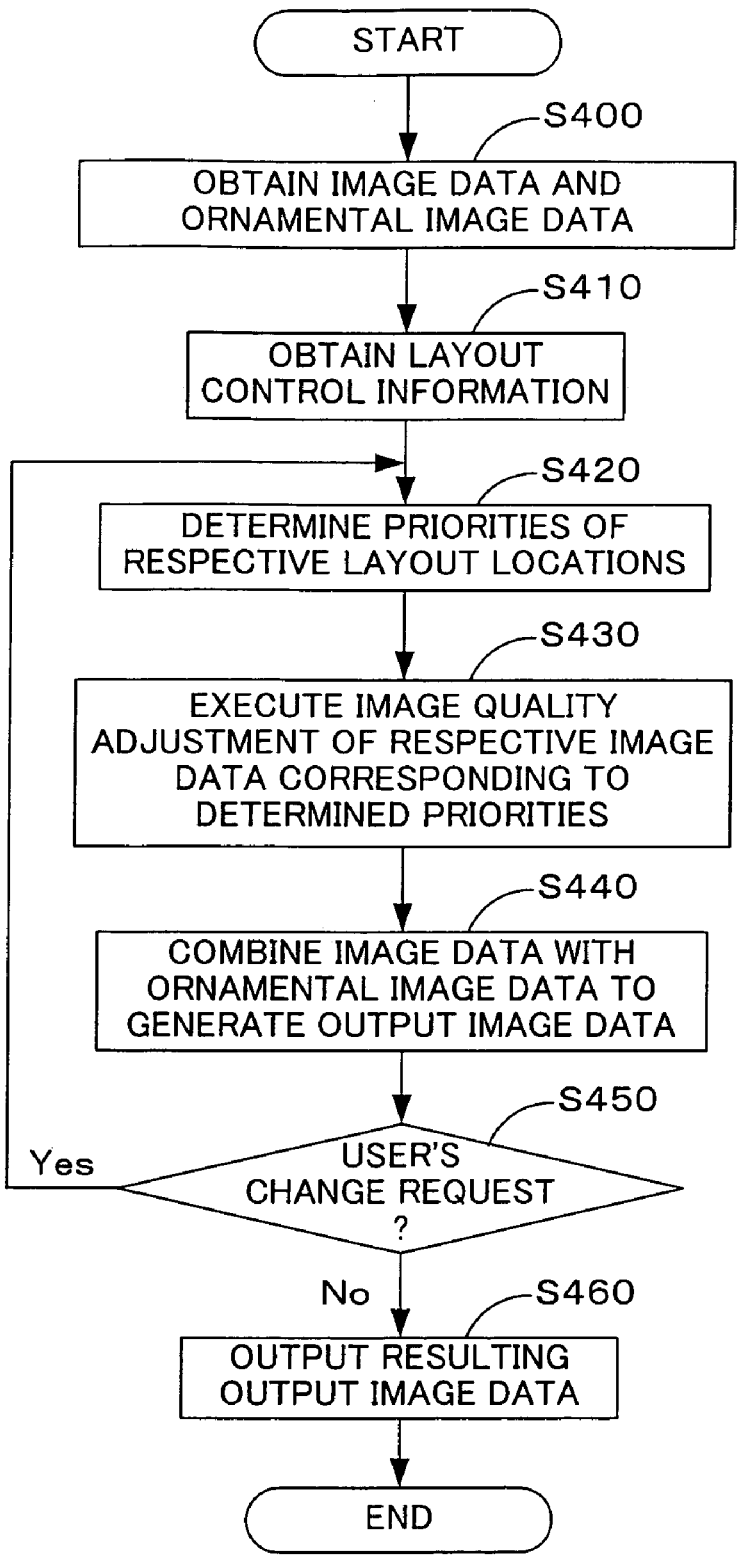
FIG. 24 is a flowchart showing an image processing routine executed by the personal computer in a fifth embodiment.
Figures 25, 26:
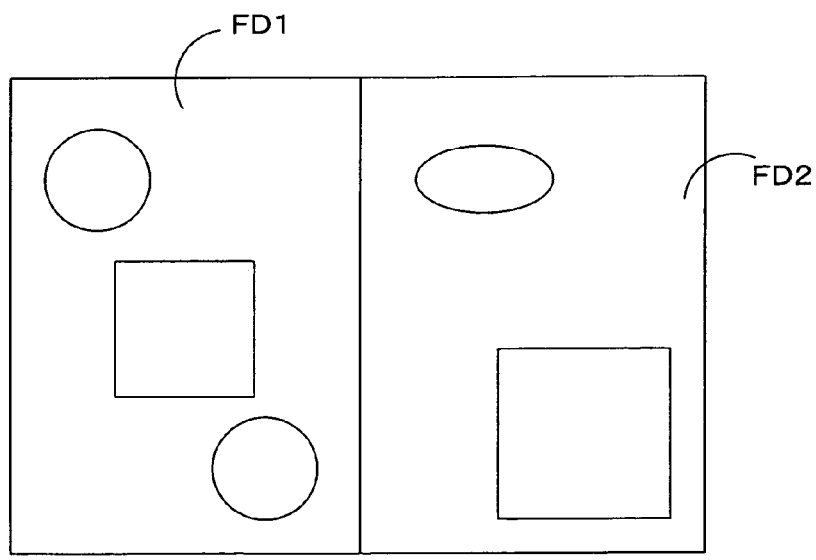
FIG. 25 shows a process of determining priorities of respective layout locations and a determination result in the fifth embodiment.
FIG. 26 shows an example using multiple ornamental image data FD.

A series of image processing executed by the personal computer in a fifth embodiment is described below with reference to FIGS. 24 through 26. FIG. 24 is a flowchart showing an image processing routine executed by the personal computer in the fifth embodiment. FIG. 25 shows a process of determining priorities of respective layout locations and a determination result in the fifth embodiment. FIG. 26 shows an example using multiple ornamental image data FD. The structure of the personal computer in the fifth embodiment is identical with the structure of the personal computer 20 in the first embodiment. The like elements are thus expressed by the like numerals and are not specifically described here.

The image processing executed by the personal computer 20 in the fifth embodiment is described below.

The image processing of this embodiment may be activated by insertion of the memory card MC into the personal computer 20 or by connection of the digital still camera 10 to the personal computer 20 via the communication cable. The image processing may otherwise be triggered by the user's operation of a keyboard to give a start command.

When the image processing starts, the personal computer 20 (CPU 200) first selects ornamental image data FD and multiple image data GD and temporarily stores the selected ornamental image data FD and the selected multiple image data GD in the RAM 201 (step S400). The ornamental image data FD may be selected on the digital still camera 10, may be selected among a number of ornamental image data stored in advance in the HDD 202 of the personal computer 20 through the operations of the keyboard, or may be selected via a network. The image data GD may be selected on the digital still camera 10 or on the personal computer 20 through the operations of the keyboard. The typical procedure first selects (determines) desired ornamental image data FD and subsequently selects plurality of desired image data to be pasted in the layout locations of the ornamental image data GD.

Unlike the above embodiments, the layout control information LI of this embodiment related to the ornamental image data FD does not specify the correction levels or the correction rates but has specification of layout locations, layout dimensions, and α channel data.

The CPU 200 obtains layout control information LI from the ornamental image file FF (step S410) and determines (sets) the priorities of the respective layout locations according to the layout locations and the layout dimensions specified in the obtained layout control information LI (step S420). The layout location is determined by the absolute difference between the center of gravity of each layout location and the center of gravity of a print page (or the whole ornamental image data) according to Equation (1) given below:

$$\text{Layout Location} = |\text{Gravity Center of Layout Location} - \text{Gravity Center of Print Page}| \quad (1)$$

The procedure of this embodiment uses the layout dimensions (that is, the areas of the layout locations) as the main base of setting the priorities. For example, in the ornamental image data FD having the layout locations shown in FIG. 18, the 1st priority is given to the largest layout location B, the 2nd priority to the second largest layout location A, and the 3rd priority to the remaining layout location C as shown in FIG. 25. Both the layout locations C and A are arranged at the corners, but the layout location C has the smallest area and accordingly has the 3rd priority. The higher priority may be given to the layout location having the greater layout dimensions or to the layout location closer to the center of the ornamental image data. The image pasted in the layout location having the greater layout dimensions or in the layout location closer to the center is generally conspicuous. Improvement of the image quality of this conspicuous image ensures the good impression of the whole composite image including the objective images and the ornamental image.

The CPU 200 sets the correction levels of the respective layout locations corresponding to the determined priorities as shown in FIG. 25 and executes image quality adjustment of the respective image data GD with the settings of the correction levels (step S430). The image quality adjustment with the settings of the correction levels is carried out basically with the tone curves as described in the third and the fourth embodiments.

On completion of the image quality adjustment with the settings of the correction levels (step S430), the CPU 200 combines the image data GD with the ornamental image data FD according to the layout control information LI to generate resulting output image data (step S440).

The combination of the image data GD with the ornamental image data FD according to the layout control information LI is implemented by the procedure described in the third embodiment. The CPU 200 then determines whether any user's change request is entered from the input device, such as a keyboard or a mouse (step S450). In the case of no entry of the user's change request (step S450: No), the program goes to step S460.

In the case of any entry of the user's change request (step S450: Yes), on the other hand, the CPU 200 changes the selection of the image data and the layout locations of the selected image data according to the user's requirements and repeats the processing of steps S420 and S440. The user's demands are accordingly reflected on the selection of the image data to be laid out in the ornamental image data and the layout locations of the image data in the ornamental image data.

The CPU 200 outputs resulting output image data to the printer 30 (printer driver) or the display 25 (step S460) and terminates this image processing routine.

As described above, the personal computer 20 as the image processing device of the fifth embodiment determines the priorities of the respective layout locations according to the layout locations and the layout dimensions specified in the layout control information LI, sets the correction levels of the respective image data GD to be pasted in the respective layout locations corresponding to the determined priorities, and executes image quality adjustment with the settings of the correction levels. The layout control information LI is utilized to vary the degrees of image quality adjustment of the image data GD according to the layout locations and thereby change the impression of the image data GD pasted in the respective layout locations. The concrete procedure sets the higher correction level of the largest image data than the correction levels of the other image data and thereby improves the impression of the output image of the largest image data.

In the case where multiple image data GD are to be laid out on multiple ornamental image data FD1 and FD2 as shown in FIG. 26, the procedure of this embodiment determines the priorities of the respective layout locations in the multiple ornamental image data FD1 and FD2. The priorities of the respective layout locations in the ornamental image data FD1 and FD2 are determined according to the layout locations and the layout dimensions (areas). The relative correction levels can thus be set to the respective layout locations included in the multiple ornamental image data FD.

The layout control information LI may include the settings of the priorities with regard to each of the ornamental image data FD1 and FD2. In this case, the correction levels of the respective layout locations are determined without the priority setting step. The priorities of the layout locations in the multiple ornamental image data FD may be determined according to the layout locations and the layout dimensions.

The user may specify the priorities of the respective ornamental image data FD through the operation of a non-illustrated input device, such as a keyboard or a mouse. This ensures image processing with reflection of the user's demands.

The fifth embodiment uses the layout dimensions as the main base of setting the priorities. The layout locations may alternatively be used as the main base of setting the priorities. In this case, for example, the higher priority is given to the layout location closer to the center of the ornamental image data FD.

Sixth Embodiment

The third through the sixth embodiments respectively set the correction levels, the correction rates, and the priorities of the respective layout locations in the ornamental image data by referring to the layout control information LI, but do not take into account the relevance (effects) of the respective image data GD. A sixth embodiment makes the result of analysis of key image data reflected on auto image quality adjustment (image quality adjustment process that analyzes image data GD and sets the correction rates or the correction levels of the respective image data GD) of the other image data GD and correlates the image quality adjustment of the other image data to the image quality adjustment of the key image data.

For the contrast enhancement, for example, the procedure combines the luminance values (characteristic values) obtained by analysis of another image data with the luminance values (characteristic values) obtained by analysis of key image data with a preset weighting ratio to compute composite luminance values (characteristic values) and adjusts the contrast of another image data with the computed composite luminance values.

Combination of the luminance values (YminB, YmaxB) of the image data GD pasted in the layout location B and the luminance values (YminA, YmaxA) of the image data GD pasted in the layout location A with a weighting ratio of 1 to 1 gives:

$YminA' = (YminB + YminA)/2$ $YmaxA' = (YmaxB + YmaxA)/2$

The contrast of the layout location A is enhanced with the computed composite luminance values (YminA', YmaxA'). The contrast of the image data GD in the layout location A is enhanced by the effect of the image data GD in the layout location B. The image data GD in the layout location A is accordingly well matched with the image data GD in the layout location B.

Arbitrary image data GD may be correlated with weighting coefficients shown in FIG. 27. FIG. 27 shows weighting coefficients applied to image data GD, which are laid out in respective layout locations on ornamental image data FD.

When the key image data GD is pasted in the layout location A (that is, when the layout location A is the main layout location), the characteristic values of the image data GD in the layout locations B and C are replaced by the characteristic values of the image data GD in the layout location A. Namely the characteristic values of the image data GD in the layout location A are set to the composite characteristic values of the image data GD in the layout locations B and C.

When the key image data GD is pasted in the layout location B (that is, when the layout location B is the main layout location), the composite characteristic values applied to the image data GD in the layout location A are set by combining the characteristic values of the image data GD in the layout location A with the characteristic values of the image data GD in the layout location B at a ratio of 1 to 1. The characteristic values of the image data GD in the layout location B are set to the composite characteristic values applied to the image data GD in the layout location C.

When the key image data GD is pasted in the layout location C (that is, when the layout location C is the main layout location), the composite characteristic values applied to the image data GD in the layout location A are set by combining the characteristic values of the image data GD in the layout location A with the characteristic values of the image data GD in the layout location B at a ratio of 2 to 3. The characteristic values of the image data GD in the layout location C are set to the composite characteristic values applied to the image data GD in the layout location B.

The procedure of the sixth embodiment combines the result of analysis (characteristic values) of another image data with the result of analysis (characteristic values) of key image data with a preset weight and executes image quality adjustment of another image data with the composite result of analysis. This makes the image quality of another image data well matched with the image quality of the key image data and thus gives the mutually relevant image qualities to the respective image data pasted on the ornamental image data FD.

MODIFIED EXAMPLES

The fourth embodiment and the fifth embodiment do not carry out image quality adjustment based on the results of analysis of image data. The fourth embodiment and the fifth embodiment may be modified to carry out image quality adjustment based on the results of analysis of image data, as described in the third embodiment.

Modifications

In the embodiments discussed above, the personal computer 20 is adopted as the image processing device to execute the series of image processing. The image processing device is, however, not restricted to the personal computer but may be, for example, a standalone printer or a standalone display device having the image processing functions to execute the series of image processing. The technique of the invention is also attained by a printer driver, a video driver, and an image processing application program without the hardware configuration of the image processing device. Available examples of the display device include CRTs, liquid crystal displays, and projectors that have the image quality adjustment function with regard to image data and are capable of displaying a resulting output image according to the quality-adjusted image data GD.

All or part of the image processing may be executed by the digital still camera 10, in place of the personal computer PC. In this case, the image processing functions discussed in any of the first through the sixth embodiments are added to an image data processing application program, for example, a retouch application program or a printer driver stored in a ROM of the digital still camera 10. Print data, which include print image data and print control commands and are generated by the digital still camera 10, are given to the printer 30 via the cable or via the memory card MC. The printer 30 receives the print data and creates a dot pattern on a printing medium according to the received print image data to output a printed image. The digital still camera 10 may alternatively give output image data (processed image data) to the personal computer 20 or the printer 30. The personal computer 20 or the printer 30 then generates print data including print control commands.

In the above embodiments, the series of image processing are executed by the image processing software or the computer programs. The image processing may alternatively be attained by an image processing hardware circuit including logic circuits of respective processing steps. This modified structure relieves the process load of the CPU 200 and ensures the higher-speed image processing. The image processing hardware circuit is mounted, for example, as a packaged circuit in the digital still camera 10 and the printer 30 or as an add-on card in the personal computer 20.

The image processing device, the image processing method, and the image processing program of the invention are described in detail with reference to some embodiments. These embodiments discussed above are, however, to be considered in all aspects as illustrative and not restrictive. There may be many modifications, changes, and alterations without departing from the scope or spirit of the main characteristics of the present invention. All changes within the meaning and range of equivalency of the claims are intended to be embraced therein.

The following Japanese patent applications as the basis of the priority claim of this application are incorporated in the disclosure hereof by reference:

Japanese Patent Application No. 2003-316124 (filing date: Sep. 9, 2003); and

Japanese Patent Application No. 2003-316126 (filing date: Sep. 9, 2003).

What is claimed is:

1. An image processing device that executes image processing of subject image data, which is to be laid out on a piece of ornamental image data, said image processing device comprising:

a subject image data acquisition module that obtains the subject image data;

an ornamental image data acquisition module that obtains the piece of ornamental image data, the piece of ornamental image data being image data having a preset subject;

a layout control information acquisition module that obtains layout control information, which is related to the obtained ornamental image data and specifies a layout location and layout dimensions of the subject image data to be laid out on the piece of ornamental image data and image quality adjustment information regarding the subject image data, the image quality adjustment information being related to the layout control information and specifying a correction level of the subject image data;

a characteristic value determination module that analyzes the subject image data to specify a characteristic value of an image quality adjustment parameter affecting image quality of the subject image data;

a correction rate setting module that sets a correction rate of the subject image data, in order to cancel out or reduce a difference between the specified characteristic value and a preset reference value, the correction rate setting module setting correction rates with regard to multiple image quality adjustment parameters affecting the image quality of the subject image data;

an image quality adjustment module that executes image quality adjustment of the obtained subject image data according to the image quality adjustment information specified in the obtained layout control information; and an output image data generation module that generates and outputs output image data from the subject image data that has been processed through the image quality adjustment, and the piece of ornamental image data according to the layout control information, the output image data being output to a printing device or a display device, wherein the correction level is used to vary the correction rate, wherein the correction level is set with regard to each of the multiple image quality adjustment parameters and is suited to the preset subject of the piece of ornamental image data, and wherein each module in the image processing device is executed by an integrated circuit.

2. An image processing device in accordance with claim 1, wherein the image quality adjustment information includes correction information of the subject image data.

3. An image processing device in accordance with claim 2, wherein the correction information of the subject image data includes at least one correction rate of at least one image quality adjustment parameter affecting image quality of the subject image data.

4. An image processing device in accordance with claim 2, wherein the ornamental image data is image data having a preset subject, and the correction information of the subject image data includes correction rates of multiple image quality adjustment parameters suited to the preset subject of the ornamental image data.

5. An image processing device in accordance with claim 1, wherein image processing control information for specifying an image processing condition is related to the subject image data, and said image quality adjustment module uses the image processing control information preferentially over the image quality adjustment information to execute image quality adjustment of the subject image data.

6. An image processing device in accordance with claim 1, wherein image processing control information for specifying an image processing condition is related to the subject image data, and said image quality adjustment module uses the image quality adjustment information preferentially over the image processing control information to execute image quality adjustment of the subject image data.

7. An image processing device in accordance with claim 1, wherein image processing control information for specifying an image processing condition is related to the subject image data, and said image quality adjustment module uses combination of the image quality adjustment information with the image processing control information to execute image quality adjustment of the subject image data.

8. An image processing device in accordance with claim 1, wherein the piece of ornamental image data has multiple layout locations, said subject image data acquisition module obtains multiple subject image data, the layout control information is related to the obtained ornamental image data and specifies layout locations and layout dimensions of the multiple subject image data, which are laid out on the piece of ornamental image data having the multiple layout locations, and image quality adjustment information regarding the multiple subject image data, said image quality adjustment module executes image quality adjustment of the obtained multiple subject image data to be laid out in the respective layout locations on the piece of ornamental image data according to the image quality adjustment information specified in the obtained layout control information, and said output image data generation module generates the output image data from the multiple subject image data, which have gone through the image quality adjustment, and the piece of ornamental image data according to the layout control information.

9. An image processing device in accordance with claim 1, said image processing device further comprising:

a modification module that modifies a result of the image quality adjustment of the subject image data executed according to the image quality adjustment information.

10. An image processing method that executes image processing of subject image data, which is to be laid out on a piece of ornamental image data, said image processing method comprising:

obtaining the subject image data;

obtaining the piece of ornamental image data, the piece of ornamental image data being image data having a preset subject;

obtaining layout control information, which is related to the obtained ornamental image data and specifies a layout location and layout dimensions of the subject image data to be laid out on the ornamental image data and image quality adjustment information regarding the subject image data, the image quality adjustment information being related to the layout control information and specifying a correction level of the subject image data;

analyzing the subject image data to specify a characteristic value of an image quality adjustment parameter affecting image quality of the subject image data;

setting a correction rate of the subject image data, in order to cancel out or reduce a difference between the specified characteristic value and a preset reference value, the setting of the correction rate including setting correction rates with regard to multiple image quality adjustment parameters affecting the image quality of the subject image data;

executing image quality adjustment of the obtained subject image data according to the image quality adjustment information specified in the obtained layout control information;

generating output image data from the subject image data, which has gone through the image quality adjustment, and the ornamental image data according to the layout control information; and outputting the output image data to a device selected from the group consisting of a printing device, a display device, and a storage device, wherein the correction level is used to vary the correction rate, wherein the correction level is set with regard to each of the multiple image quality adjustment parameters and is suited to the preset subject of the piece of ornamental image data, and wherein each operation in the image processing method is executed by an integrated circuit.

11. An image processing method in accordance with claim 10, wherein said subject image data obtaining is executed by obtaining multiple subject image data, said layout control information is related to the obtained ornamental image data and specifies layout locations and layout dimensions of the multiple subject image data to be laid out on the ornamental image data having multiple layout locations, as well as image quality adjustment information regarding the multiple subject image data, said image quality adjustment executing is executed by executing image quality adjustment of the obtained multiple subject image data to be laid out in the respective layout locations on the ornamental image data according to the image quality adjustment information specified in the obtained layout control information, and said output image data generating is executed by generating the output image data from the multiple subject image data, which have gone through the image quality adjustment, and the ornamental image data according to the layout control information.

12. An image processing device that executes image processing of subject image data, which is to be laid out on ornamental image data, said image processing device comprising:

a subject image data selection module that selects multiple subject image data to be laid out in multiple layout locations of the ornamental image data, the multiple layout locations being the ones on a single piece of ornamental image data;

a subject image data analyzing module that analyzes each of the selected multiple subject image data to determine a characteristic value of an image quality adjustment parameter affecting image quality of the subject image data;

an image quality adjustment module that obtains layout control information, which specifies layout locations and layout dimensions of the selected multiple subject image data to be laid out in the respective layout locations on the ornamental image data and correction rates of the selected multiple subject image data in the respective layout locations, and executes image quality adjustment of the selected multiple subject image data with the specified correction rates, the correction rates of the selected multiple subject image data being related to the layout control information and being set corresponding to at least either of the layout location and the layout dimensions, wherein the image quality adjustment module executes the image quality adjustment of each of the selected multiple subject image data with the correction rate, which is set to cancel out or reduce a difference between the determined characteristic value and a preset reference value with regard to the image quality adjustment parameter; and an output image data generation module that generates and outputs output image data from the multiple subject image data, which have gone through the image quality adjustment, and the ornamental image data according to the layout control information, the output image data being output to a printing device or a display device, wherein the correction rate of subject image data located in a center area of the ornamental image data is set to be greater than the correction rate of subject image data located in another area of the ornamental image data, wherein the image quality adjustment module executes the image quality adjustment of the selected multiple subject image data, in such a manner that a degree of reduction of the difference increases with an increase in correction rate, and wherein each module in the image processing device is executed by an integrated circuit.

13. An image processing device in accordance with claim 12, said image processing device further comprising:

a modification module that modifies a result of the image quality adjustment of each of the selected multiple subject image data executed by said image quality adjustment module.

14. An image processing device that executes image processing of subject image data, which is to be laid out on ornamental image data, said image processing device comprising:

a subject image data selection module that selects multiple subject image data to be laid out in multiple layout locations of the ornamental image data, the multiple layout locations being the ones on a single piece of ornamental image data;

a subject image data analyzing module that analyzes each of the selected multiple subject image data to determine a characteristic value of an image quality adjustment parameter affecting image quality of the subject image data;

an image quality adjustment module that obtains layout control information, which specifies layout locations and layout dimensions of the selected multiple subject image data to be laid out in the respective layout locations on the ornamental image data and correction rates of the selected multiple subject image data in the respective layout locations, and executes image quality adjustment of the selected multiple subject image data with the specified correction rates, the correction rates of the selected multiple subject image data being related to the layout control information and being set corresponding to at least either of the layout location and the layout dimensions, wherein the image quality adjustment module executes the image quality adjustment of each of the selected multiple subject image data with the correction rate, which is set to cancel out or reduce a difference between the determined characteristic value and a preset reference value with regard to the image quality adjustment parameter; and an output image data generation module that generates and outputs output image data from the multiple subject image data, which have gone through the image quality adjustment, and the ornamental image data according to the layout control information, the output image data being output to a printing device or a display device, wherein the correction rate of subject image data having largest layout dimensions is set to be greater than the correction rate of another subject image data, wherein the image quality adjustment module executes the image quality adjustment of the selected multiple subject image data, in such a manner that a degree of reduction of the difference increases with an increase in correction rate, and wherein each module in the image processing device is executed by an integrated circuit.

15. An image processing device that executes image processing of subject image data, which is to be laid out on ornamental image data, said image processing device comprising:
- a subject image data selection module that selects multiple subject image data to be laid out in multiple layout locations of the ornamental image data, the multiple layout locations being the ones on a single piece of ornamental image data;
- a subject image data analyzing module that analyzes each of the selected multiple subject image data to determine a characteristic value of an image quality adjustment parameter affecting image quality of the subject image data;
- an image quality adjustment level setting module that obtains layout control information, which specifies layout locations and layout dimensions of the selected multiple subject image data laid out on the ornamental image and priorities of the respective layout locations, and sets image quality adjustment levels of the respective selected subject image data corresponding to the specified priorities, the image quality adjustment levels of the respective selected subject image data being related to the layout control information;
- an image quality adjustment module that executes image quality adjustment of the selected multiple subject image data according to the image quality adjustment levels; and
- an output image data generation module that generates and outputs output image data from the multiple subject image data, which have gone through the image quality adjustment, and the ornamental image data according to the layout control information, the output image data being output to a printing device or a display device,
- wherein the image quality adjustment module executes image quality adjustment of each of the selected multiple subject image data to cancel out or reduce a difference between the determined characteristic value and a preset reference value with regard to the image quality adjustment parameter,
- wherein the image quality adjustment level setting module sets the image quality adjustment levels of the respective selected subject image data to give a higher degree of the reduction of the difference for subject image data located in a certain layout location having a highest priority than a degree of the reduction of the difference for subject image data located in another layout location, and
- wherein each module in the image processing device is executed by an integrated circuit.

16. An image processing device in accordance with claim 15, wherein said image quality adjustment level setting module sets the image quality adjustment levels of the respective selected subject image data to give a higher degree of correction for subject image data located in a certain layout location having a highest priority than a degree of correction for subject image data located in another layout location.

17. An image processing device in accordance with claim 15, wherein said image quality adjustment level setting module sets the image quality adjustment levels of the respective selected subject image data to give a substantially equal degree of correction for subject image data located in a certain layout location having a highest priority with a degree of correction for subject image data located in another layout location.

18. An image processing device in accordance with claim 15, wherein a higher priority is given to a layout location having larger layout dimensions.

19. An image processing device in accordance with claim 15, wherein a higher priority is given to a layout location closer to a center of the ornamental image data.

20. An image processing device that executes image processing of multiple subject image data according to layout control information, which specifies layout locations and layout dimensions of the multiple subject image data laid out on ornamental image data, said image processing device comprising:
- a subject image data selection module that selects the multiple subject image data to be laid out in multiple layout locations of the ornamental image data, the multiple layout locations of the ornamental image data being previously prepared, and the multiple layout locations being the ones on a single piece of ornamental image data;
- a subject image data analyzing module that analyzes each of the selected multiple subject image data to determine a characteristic value of an image quality adjustment parameter affecting image quality of the subject image data;
- a priority allocation module that allocates priorities to the multiple layout locations;
- an image quality adjustment module that executes image quality adjustment of the selected multiple subject image data, based on the allocated priorities; and
- an output image data generation module that generates and outputs output image data from the multiple subject image data, which have gone through the image quality adjustment, and the ornamental image data according to the layout control information, the layout control information including information for enlarging and reducing the size of each of the multiple subject image data to fit in each layout location in the ornamental image, and the output image data being output to a printing device or a display device,
- wherein the image quality adjustment module executes the image quality adjustment of each of the selected multiple subject image data, in such a manner that a degree of reduction of a difference between the determined characteristic value and a preset reference value with regard to the image quality adjustment parameter for subject image data located in a certain layout location having a highest priority is set higher than a degree of reduction of the difference for subject image data located in another layout location, and
- wherein each module in the image processing device is executed by an integrated circuit.

21. An image processing device in accordance with claim 20, wherein said priority allocation module allocates the priorities to the layout locations corresponding to positions and dimensions of the respective layout locations.

22. An image processing device in accordance with claim 20, said image processing device further comprising:
- a priority input module that inputs preset priorities,
- wherein said priority allocation module allocates the input preset priorities to the respective layout locations.

23. An image processing device in accordance with claim 20, said image processing device further comprising:
- a modification module that modifies a result of the image quality adjustment of each of the selected multiple subject image data executed by said image quality adjustment module.

24. An image processing device in accordance with claim 20, wherein said image quality adjustment module executes the image quality adjustment of the selected multiple subject image data, in such a manner that a degree of correction of subject image data located in a layout location having a highest priority is set higher than a degree of correction of subject image data located in another layout location.

25. An image processing method that executes image processing of subject image data, which is to be laid out on ornamental image data, said image processing method comprising the steps of:

selecting multiple subject image data to be laid out in multiple layout locations of the ornamental image data, the multiple layout locations being the ones on a single piece of ornamental image data;

analyzing each of the selected multiple subject image data to determine a characteristic value of an image quality adjustment parameter affecting image quality of the subject image data;

obtaining layout control information, which specifies layout locations and layout dimensions of the selected multiple subject image data to be laid out in the respective layout locations on the ornamental image data and correction rates of the selected multiple subject image data in the respective layout locations, and executing image quality adjustment of the selected multiple subject image data with the specified correction rates, the correction rates of the selected multiple subject image data being related to the layout control information and being set corresponding to at least either of the layout location and the layout dimensions, wherein the executing of the image quality adjustment includes executing the image quality adjustment of each of the selected multiple subject image data with the correction rate, which is set to cancel out or reduce a difference between the determined characteristic value and a preset reference value with regard to the image quality adjustment parameter;

generating output image data from the multiple subject image data, which have gone through the image quality adjustment, and the ornamental image data according to the layout control information; and outputting the output image data to a device selected from the group consisting of a printing device, a display device, and a storage device, wherein the correction rate of subject image data located in a center area of the ornamental image data is set to be greater than the correction rate of subject image data located in another area of the ornamental image data, wherein the executing of the image quality adjustment includes executing the image quality adjustment of the selected multiple subject image data, in such a manner that a degree of reduction of the difference increases with an increase in correction rate, and wherein each operation in the image processing method is executed by an integrated circuit.

26. An image processing method that executes image processing of subject image data, which is to be laid out on ornamental image data, said image processing method comprising:

selecting multiple subject image data to be laid out in multiple layout locations of the ornamental image data, the multiple layout locations being the ones on a single piece of ornamental image data;

analyzing each of the selected multiple subject image data to determine a characteristic value of an image quality adjustment parameter affecting image quality of the subject image data;

obtaining layout control information, which specifies layout locations and layout dimensions of the multiple subject image data to be laid out in the respective layout locations on the ornamental image data and correction rates of the selected multiple subject image data in the respective layout locations, and executing image quality adjustment of each of the selected multiple subject image data at the correction rate to cancel out or reduce a difference between the characteristic value and a preset reference value with regard to the image quality adjustment parameter, the correction rates of the selected multiple subject image data being related to the layout control information and being set corresponding to at least either of the layout location and the layout dimensions;

generating output image data from the multiple subject image data, which have gone through the image quality adjustment, and the ornamental image data according to the layout control information; and outputting the output image data to a device selected from the group consisting of a printing device, a display device, and a storage device, wherein the correction rate of subject image data having largest layout dimensions is set to be greater than the correction rate of another subject image data, wherein the executing of the image quality adjustment includes executing the image quality adjustment of the selected multiple subject image data, in such a manner that a degree of reduction of the difference increases with an increase in correction rate, and wherein each operation in the image processing method is executed by an integrated circuit.

27. An image processing method that executes image processing of subject image data, which is to be laid out on ornamental image data, said image processing method comprising:

selecting multiple subject image data to be laid out in multiple layout locations of the ornamental image data, the multiple layout locations being the ones on a single piece of ornamental image data;

analyzing each of the selected multiple subject image data to determine a characteristic value of an image quality adjustment parameter affecting image quality of the subject image data;

obtaining layout control information, which specifies layout locations and layout dimensions of the selected multiple subject image data laid out on the ornamental image and priorities of the respective layout locations, and setting image quality adjustment levels of the respective selected subject image data corresponding to the specified priorities, the image quality adjustment levels of the respective selected subject image data being related to the layout control information;

executing image quality adjustment of the selected multiple subject image data according to the image quality adjustment levels;

generating output image data from the multiple subject image data, which have gone through the image quality adjustment, and the ornamental image data according to the layout control information; and outputting the output image data to a device selected from the group consisting of a printing device, a display device, and a storage device, wherein the executing of the image quality adjustment includes executing image quality adjustment of each of the selected multiple subject image data to cancel out or reduce a difference between the determined characteristic value and a preset reference value with regard to the image quality adjustment parameter, wherein the setting of image quality adjustment levels includes setting the image quality adjustment levels of the respective selected subject image data to give a higher degree of the reduction of the difference for subject image data located in a certain layout location having a highest priority than a degree of the reduction of the difference for subject image data located in another layout location, and wherein each operation in the image processing method is executed by an integrated circuit.

28. An image processing method that executes image processing of multiple subject image data according to layout control information, which specifies layout locations and layout dimensions of the multiple subject image data laid out on ornamental image data, said image processing method comprising:

selecting the multiple subject image data to be laid out in multiple layout locations of the ornamental image data;

analyzing each of the selected multiple subject image data to determine a characteristic value of an image quality adjustment parameter affecting image quality of the subject image data;

allocating priorities to the multiple layout locations;

executing image quality adjustment of the selected multiple subject image data, based on the allocated priorities, the image quality adjustment of the selected multiple subject image data being related to the layout control information;

generating output image data from the multiple subject image data, which have gone through the image quality adjustment, and the ornamental image data according to the layout control information; and outputting the output image data to a device selected from the group consisting of a printing device, a display device, and a storage device, wherein the executing of the image quality adjustment includes executing the image quality adjustment of each of the selected multiple subject image data, in such a manner that a degree of reduction of a difference between the determined characteristic value and a preset reference value with regard to the image quality adjustment parameter for subject image data located in a certain layout location having a highest priority is set higher than a degree of reduction of the difference for subject image data located in another layout location, and wherein each operation in the image processing method is executed by an integrated circuit.

* * * * *